United States Patent
Yuki

(10) Patent No.: US 12,417,479 B2
(45) Date of Patent: Sep. 16, 2025

(54) RECOMMENDATION DEVICE, SYSTEM, METHOD, AND NON-TRANSITORY COMPUTER-READABLE MEDIUM STORING PROGRAM

(71) Applicant: NEC Corporation, Tokyo (JP)

(72) Inventor: Honami Yuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 378 days.

(21) Appl. No.: 17/911,724

(22) PCT Filed: Mar. 30, 2020

(86) PCT No.: PCT/JP2020/014463
§ 371 (c)(1),
(2) Date: Sep. 15, 2022

(87) PCT Pub. No.: WO2021/199114
PCT Pub. Date: Oct. 7, 2021

(65) Prior Publication Data
US 2023/0360101 A1 Nov. 9, 2023

(51) Int. Cl.
*G06K 9/00* (2022.01)
*G06Q 30/0601* (2023.01)
(Continued)

(52) U.S. Cl.
CPC ....... *G06Q 30/0631* (2013.01); *G06V 40/171* (2022.01); *G06V 40/172* (2022.01); *G06V 40/50* (2022.01)

(58) Field of Classification Search
CPC .. G06V 40/172; G06V 10/764; G06V 10/774; G06V 10/82; G06V 40/168;
(Continued)

(56) References Cited

U.S. PATENT DOCUMENTS

| | | | | |
|---|---|---|---|---|
| 2009/0138805 A1* | 5/2009 | Hildreth | ............. | H04N 21/4755 715/745 |
| 2009/0167883 A1* | 7/2009 | Nozaki | ................ | H04N 1/2112 348/222.1 |
| 2021/0065260 A1* | 3/2021 | Zheng | ................ | G06Q 30/0201 |

FOREIGN PATENT DOCUMENTS

| | | |
|---|---|---|
| JP | 2004-227158 A | 8/2004 |
| JP | 2012-208854 A | 10/2012 |
| JP | 2020-016696 A | 1/2020 |

OTHER PUBLICATIONS

International Search Report for PCT Application No. PCT/JP2020/014463, mailed on Jun. 23, 2020.

* cited by examiner

Primary Examiner — Alex Kok S Liew

(57) ABSTRACT

A recommendation device includes: an acquisition unit configured to acquire a captured image; a personal authentication control unit configured to control to perform face authentication for a plurality of face regions detected from the captured image; a determination unit configured to determine that group authentication has succeeded in a case where face authentication using at least one of the plurality of users registered as a group and any one of the plurality of detected face regions has succeeded; a specifying unit configured to specify an action in the group based on the point in a case where the group authentication has succeeded; an estimation unit configured to estimate a group attribute based on a personal attribute of each user belonging to the group; a selection unit configured to select recommendation information based on the group attribute and the action; and an output unit configured to output the selected recommendation information.

11 Claims, 18 Drawing Sheets

(51) Int. Cl.
*G06V 40/16* (2022.01)
*G06V 40/50* (2022.01)

(58) Field of Classification Search
CPC .. G06V 40/175; G06V 40/103; G06V 40/171;
G06V 40/174; G06V 40/50; G06F
16/9535; G06F 16/5838; G06F 16/51;
G06F 18/214; G06F 18/24133; G06F
16/358; G06F 7/02; G06F 16/24578;
G06F 16/532; G06F 16/70; G06F
16/9538; G06F 18/217; G06F 3/0482
See application file for complete search history.

RECOMMENDATION DEVICE, SYSTEM, METHOD, AND NON-TRANSITORY COMPUTER-READABLE MEDIUM STORING PROGRAM

This application is a National Stage Entry of PCT/JP2020/014463 filed on Mar. 30, 2020, the contents of all of which are incorporated herein by reference, in their entirety.

TECHNICAL FIELD

The present invention relates to a recommendation device, a system, a method, and a non-transitory computer-readable medium storing a program, and more particularly, to a recommendation device, a system, a method, and a non-transitory computer-readable medium storing a program for providing recommendation information to a user.

BACKGROUND ART

Patent Literature 1 discloses a technology of determining the number of persons and an attribute of a group from a captured image including a plurality of persons, selecting provision information to be provided according to the attribute of the group, and outputting the provision information.

CITATION LIST

Patent Literature

Patent Literature 1: Japanese Unexamined Patent Application Publication No. 2004-227158

SUMMARY OF INVENTION

Technical Problem

However, even in a case where group attributes are the same, effective recommendation information differs depending on actions of the groups. Therefore, the technology according to Patent Literature 1 has a problem that the accuracy of recommendation is insufficient.

The present disclosure has been made to solve such a problem, and an object of the present disclosure is to provide a recommendation device, a system, a method, and a non-transitory computer-readable medium storing a program for providing appropriate recommendation information to a group.

Solution to Problem

A recommendation device according to the present disclosure includes: an acquisition unit configured to acquire a captured image obtained by imaging a plurality of persons by an imaging device installed at a predetermined point; a personal authentication control unit configured to cause face authentication to be performed for a plurality of face regions detected from the captured image by using an authentication device that stores face feature information of a plurality of users; a determination unit configured to determine that group authentication has succeeded in a case where face authentication using at least one of the plurality of users registered as a group and any one of the plurality of detected face regions has succeeded; a specifying unit configured to specify an action in the group based on the point in a case where the group authentication has succeeded; an estimation unit configured to estimate a group attribute based on a personal attribute of each user belonging to the group; a selection unit configured to select recommendation information based on the group attribute and the action; and an output unit configured to output the selected recommendation information to a predetermined display terminal.

A recommendation system according to the present disclosure includes: an imaging device configured to capture an image including a face region of a predetermined user; a recommendation device configured to be communicable with the imaging device; and an authentication device configured to store face feature information of the user and be communicable with the recommendation device, in which the recommendation device includes: an acquisition unit configured to acquire a captured image obtained by imaging a plurality of persons by an imaging device installed at a predetermined point; a personal authentication control unit configured to cause the authentication device to perform face authentication for a plurality of face regions detected from the captured image; a determination unit configured to determine that group authentication has succeeded in a case where face authentication using at least one of the plurality of users registered as a group and any one of the plurality of detected face regions has succeeded; a specifying unit configured to specify an action in the group based on the point in a case where the group authentication has succeeded; an estimation unit configured to estimate a group attribute based on a personal attribute of each user belonging to the group; a selection unit configured to select recommendation information based on the group attribute and the action; and an output unit configured to output the selected recommendation information to a predetermined display terminal.

A recommendation method according to the present disclosure performed by a computer includes: acquiring a captured image obtained by imaging a plurality of persons by an imaging device installed at a predetermined point; causing face authentication to be performed for a plurality of face regions detected from the captured image by using an authentication device that stores face feature information of a plurality of users; determining that group authentication has succeeded in a case where face authentication using at least one of the plurality of users registered as a group and any one of the plurality of detected face regions has succeeded; specifying an action in the group based on the point in a case where the group authentication has succeeded; estimating a group attribute based on a personal attribute of each user belonging to the group; selecting recommendation information based on the group attribute and the action; and outputting the selected recommendation information to a predetermined display terminal.

A non-transitory computer-readable medium according to the present disclosure records a program for performing: acquiring a captured image obtained by imaging a plurality of persons by an imaging device installed at a predetermined point; causing face authentication to be performed for a plurality of face regions detected from the captured image by using an authentication device that stores face feature information of a plurality of users; determining that group authentication has succeeded in a case where face authentication using at least one of the plurality of users registered as a group and any one of the plurality of detected face regions has succeeded; specifying an action in the group based on the point in a case where the group authentication has succeeded; estimating a group attribute based on a personal attribute of each user belonging to the group; selecting recommendation information based on the group attribute and the action; and outputting the selected recommendation information to a predetermined display terminal.

A recommendation device according to the present disclosure includes: an acquisition unit configured to acquire a captured image obtained by imaging a plurality of persons by an imaging device installed at a predetermined point; an authentication unit configured to perform face authentication for a plurality of face regions detected from the captured image by using face feature information of a plurality of users stored in advance; a determination unit configured to determine that group authentication has succeeded in a case where face authentication using at least one of the plurality of users registered as a group and any one of the plurality of detected face regions has succeeded; a specifying unit configured to specify an action in the group based on the point in a case where the group authentication has succeeded; an estimation unit configured to estimate a group attribute based on a personal attribute of each user belonging to the group; a selection unit configured to select recommendation information based on the group attribute and the action; and an output unit configured to output the selected recommendation information to a predetermined display terminal.

A recommendation method according to the present disclosure performed by a computer includes: acquiring a captured image obtained by imaging a plurality of persons by an imaging device installed at a predetermined point; performing face authentication for a plurality of face regions detected from the captured image by using face feature information of a plurality of users stored in advance; determining that group authentication has succeeded in a case where face authentication using at least one of the plurality of users registered as a group and any one of the plurality of detected face regions has succeeded; specifying an action in the group based on the point in a case where the group authentication has succeeded; estimating a group attribute based on a personal attribute of each user belonging to the group; selecting recommendation information based on the group attribute and the action; and outputting the selected recommendation information to a predetermined display terminal.

A non-transitory computer-readable medium according to the present disclosure records a program for performing: acquiring a captured image obtained by imaging a plurality of persons by an imaging device installed at a predetermined point; performing face authentication for a plurality of face regions detected from the captured image by using face feature information of a plurality of users stored in advance; determining that group authentication has succeeded in a case where face authentication using at least one of the plurality of users registered as a group and any one of the plurality of detected face regions has succeeded; specifying an action in the group based on the point in a case where the group authentication has succeeded; estimating a group attribute based on a personal attribute of each user belonging to the group; selecting recommendation information based on the group attribute and the action; and outputting the selected recommendation information to a predetermined display terminal.

Advantageous Effects of Invention

According to the present disclosure, it is possible to provide the recommendation device, the system, the method, and the non-transitory computer-readable medium storing the program for providing appropriate recommendation information to a group.

EXAMPLE EMBODIMENT

Figure 1:
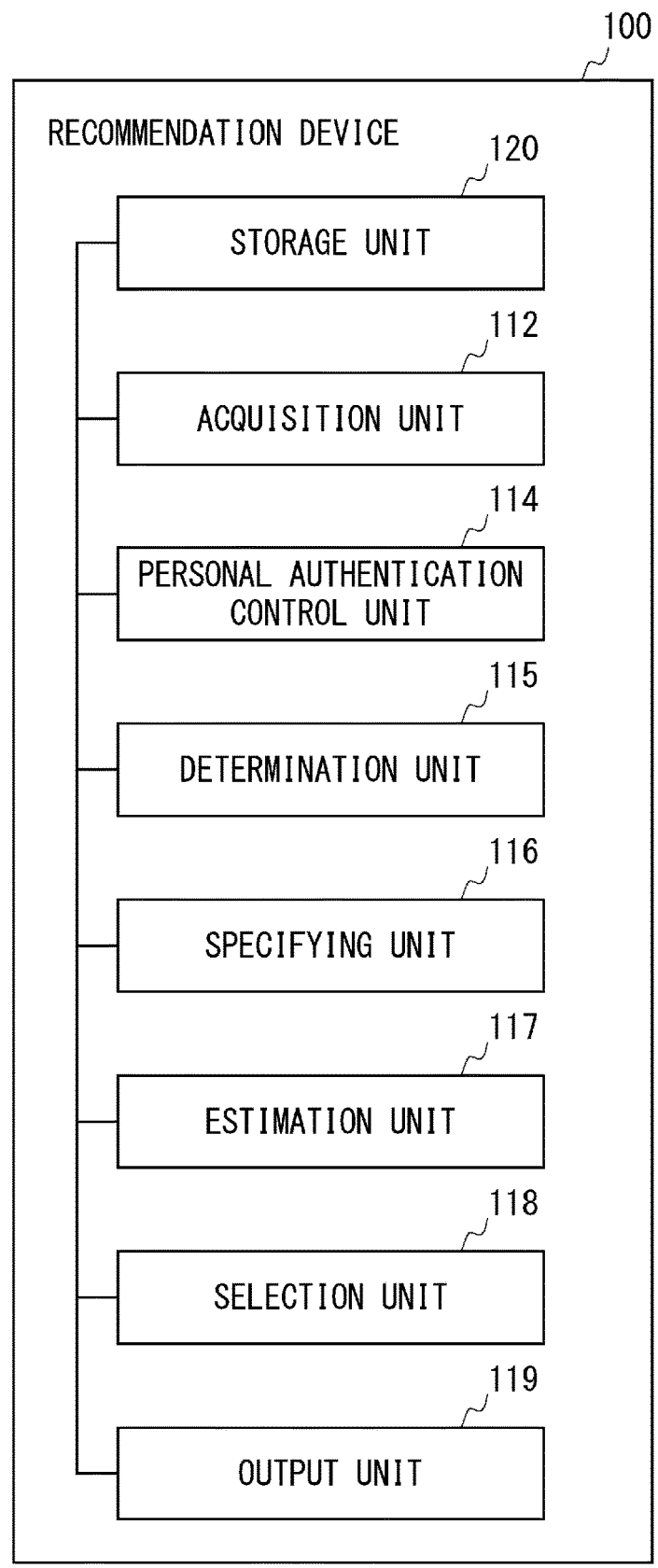
FIG. 1 is a block diagram illustrating a configuration of a recommendation device according to a first example embodiment.

Hereinafter, example embodiments of the present disclosure will be described in detail with reference to the drawings. In the drawings, the same or corresponding elements are denoted by the same reference signs, and an overlapping description is omitted as necessary for clarity of description.

First Example Embodiment

FIG. 1 is a block diagram illustrating a configuration of a recommendation device 100 according to a first example embodiment. It is assumed that the recommendation device 100 may include at least an acquisition unit 112, a personal authentication control unit 114, a determination unit 115, a specifying unit 116, an estimation unit 117, a selection unit 118, and an output unit 119, and may further include a storage unit 120. The recommendation device 100 is connected to a network 500 (not illustrated). The network 500 may be a wired network or a wireless network. An authentication device 200, a face authentication terminal 300, a user terminal 400, and the like (not illustrated) are connected to the network 500.

The storage unit 120 stores a set of identification information and personal attributes of a plurality of users as a group. Note that although the storage unit 120 is provided in the recommendation device 100 in the example illustrated in FIG. 1, the storage unit 120 may be provided outside the recommendation device 100. The storage unit 120 may be provided in the authentication device 200, for example. The acquisition unit 112 acquires a captured image obtained by imaging a plurality of persons by an imaging device installed at a predetermined point. The imaging device is, for example, the face authentication terminal 300 or the user terminal 400. The personal authentication control unit 114 causes face authentication to be performed for a plurality of face regions detected from the captured image by using the authentication device 200 that stores face feature information of the plurality of users. In a case where the face authentication using each piece of face feature information of each user belonging to the group and any one of the plurality of detected face regions has succeeded, the determination unit 115 determines that group authentication has succeeded.

In a case where the group authentication has succeeded, the specifying unit 116 specifies an action in the group based on the point. The estimation unit 117 estimates a group attribute based on the personal attribute of each user belonging to the group. The selection unit 118 selects recommendation information based on the group attribute and the action. The output unit 119 outputs the selected recommendation information to a predetermined display terminal. The display terminal is, for example, the face authentication terminal 300, the user terminal 400, a signage, or the like. The user terminal 400 is a communication terminal such as a smartphone carried by a user. The signage is a terminal installed on a street or the like, and displays, for example, "how about visiting ∘∘ next?" or the like when a user stands in front of the signage.

Figure 2:
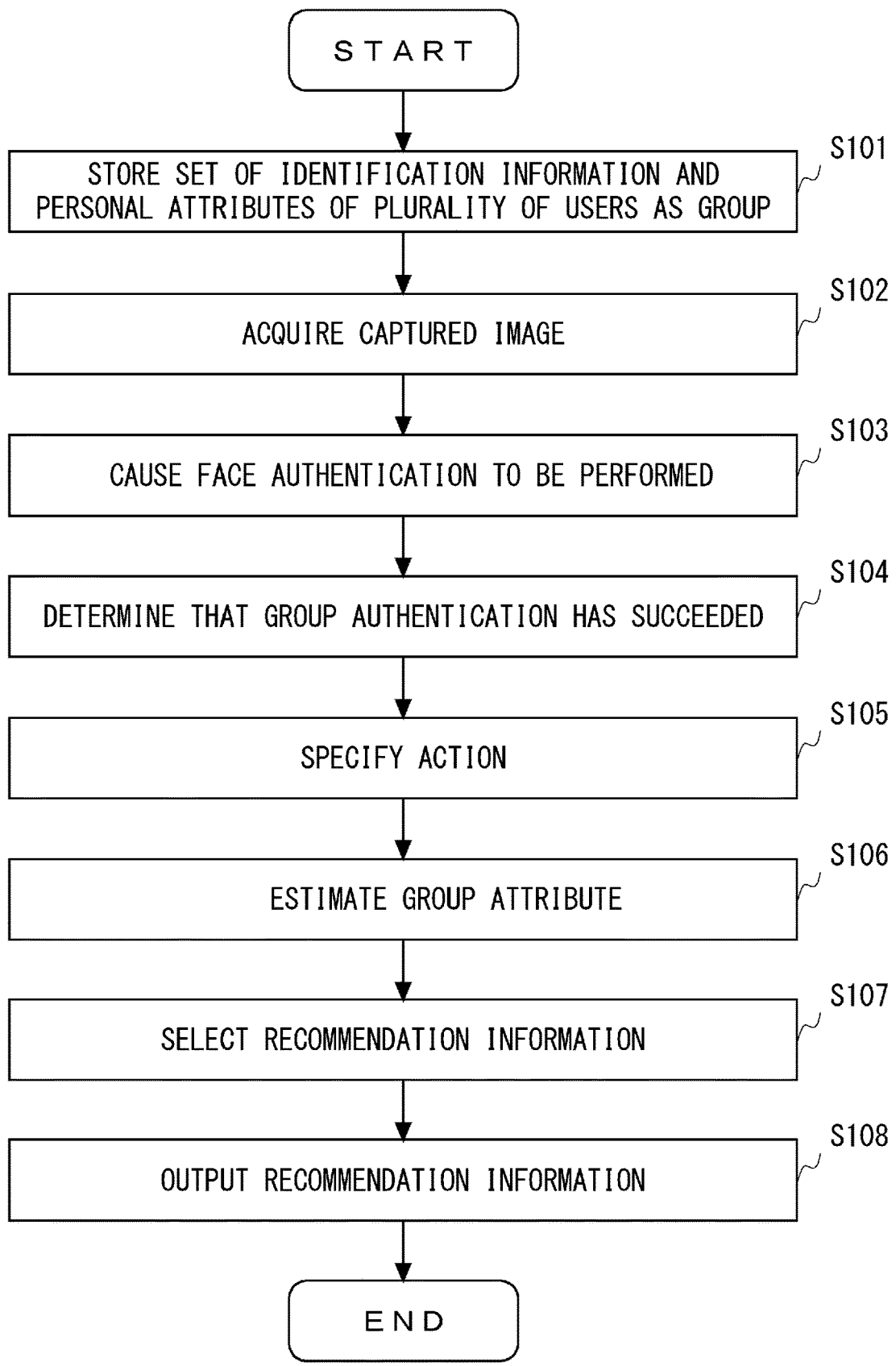
FIG. 2 is a flowchart illustrating a flow of a recommendation method according to the first example embodiment.

FIG. 2 is a flowchart illustrating a flow of a recommendation method according to the first example embodiment. First, the storage unit 120 stores a set of identification information and personal attributes of a plurality of users as a group (Step S101). Next, the acquisition unit 112 acquires a captured image obtained by imaging a plurality of persons by an imaging device installed at a predetermined point (Step S102). Next, the personal authentication control unit 114 causes face authentication to be performed for a plurality of face regions detected from the captured image by using the authentication device 200 that stores face feature information of the plurality of users (Step S103). Once a face authentication request is received from the personal authentication control unit 114, the authentication device 200 collates the face feature information included in the captured image with the face feature information registered in the authentication device 200, and performs the face authentication by determining whether or not the authentication is successful based on whether or not the pieces of face feature information match each other. In a case where the face authentication has succeeded, the authentication device 200 includes, in the determination result, a user ID for which the authentication has succeeded, and transmits the determination result as a response to the recommendation device 100.

Next, in a case where the face authentication using each piece of face feature information of each user belonging to the group and any one of the plurality of detected face regions has succeeded, the determination unit 115 determines that group authentication has succeeded (Step S104). Next, in a case where the group authentication has succeeded, the specifying unit 116 specifies an action in the group based on the point (Step S105). Next, the estimation unit 117 estimates a group attribute based on the personal attribute of each user belonging to the group (Step S106). Next, the selection unit 118 selects recommendation information based on the group attribute and the action (Step S107). Next, the output unit 119 outputs the selected recommendation information to a predetermined display terminal (Step S108). As described above, since the recommendation method according to the present example embodiment can present recommendation information based on a group attribute and an action, it is possible to provide appropriate recommendation information to a group.

Note that the recommendation device 100 includes a processor, a memory, and a storage device as components not illustrated. Furthermore, the storage device stores a computer program in which processing of the recommendation method according to the present example embodiment is implemented. Then, the processor reads the computer program from the storage device into the memory, and executes the computer program. As a result, the processor implements the functions of the acquisition unit 112, the personal authentication control unit 114, the determination unit 115, the specifying unit 116, the estimation unit 117, the selection unit 118, and the output unit 119.

Alternatively, each of the storage unit 120, the acquisition unit 112, the personal authentication control unit 114, the determination unit 115, the specifying unit 116, the estimation unit 117, the selection unit 118, and the output unit 119 may be implemented by dedicated hardware. In addition, some or all of the components of each device may be implemented by a general-purpose or dedicated circuitry, a processor, or the like, or a combination thereof. These may be implemented by a single chip or may be implemented by a plurality of chips connected via a bus. Some or all of the components of each device may be implemented by a combination of the above-described circuit or the like and a program. Furthermore, a central processing unit (CPU), a graphics processing unit (GPU), a field-programmable gate array (FPGA), or the like can be used as the processor.

Furthermore, in a case where some or all of the components of the recommendation device 100 are implemented by a plurality of information processing devices, circuits, and the like, the plurality of information processing devices, circuits, and the like may be arranged in a centralized manner or in a distributed manner. For example, the information processing devices, the circuits, and the like may be implemented in a form in which each of them is connected via a communication network, such as a client server system or a cloud computing system. Furthermore, the function of the recommendation device 100 may be provided in a software as a service (SaaS) format.

Second Example Embodiment

A second example embodiment is a modification of the first example embodiment described above. The recommendation device 100 according to the first example embodiment performs face authentication by using the external authentication device 200. On the other hand, a recommendation device 600 according to the present example embodiment performs face authentication inside the recommendation device 600.

Figure 3:
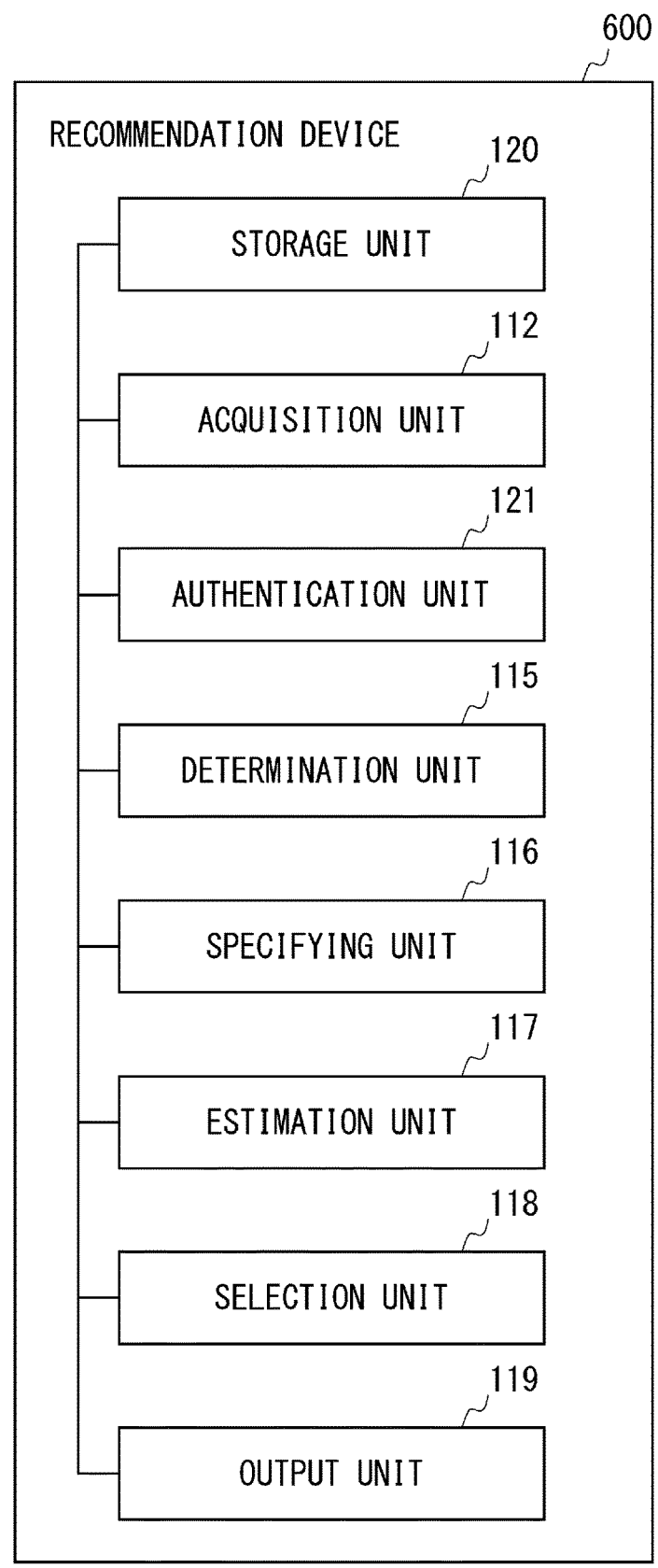
FIG. 3 is a block diagram illustrating a configuration of a recommendation device according to a second example embodiment.

FIG. 3 is a block diagram illustrating a configuration of the recommendation device 600 according to the second example embodiment. In the recommendation device 600, the personal authentication control unit 114 in the configuration of the recommendation device 100 illustrated in FIG. 1 is replaced with an authentication unit 121, and a face feature database (DB) (not illustrated) is further included. The face feature DB is a database that stores a user ID and face feature information in association with each other. For each component included in the recommendation device 600, a description overlapping with that of the first example embodiment will be omitted as appropriate.

The authentication unit 121 performs face authentication by using face feature information of a plurality of users stored in advance for a plurality of face regions detected from a captured image. In the face authentication, the authentication unit 121 extracts a plurality of pieces of face feature information from the captured image, collates each piece of face feature information with the face feature information stored in the face feature DB, and determines whether or not the authentication is successful based on whether or not the pieces of face feature information match each other. The face feature DB stores face feature information of a plurality of registered users. The authentication unit 121 transmits, to the determination unit 115, a result indicating the success or failure of the face authentication.

Figure 4:
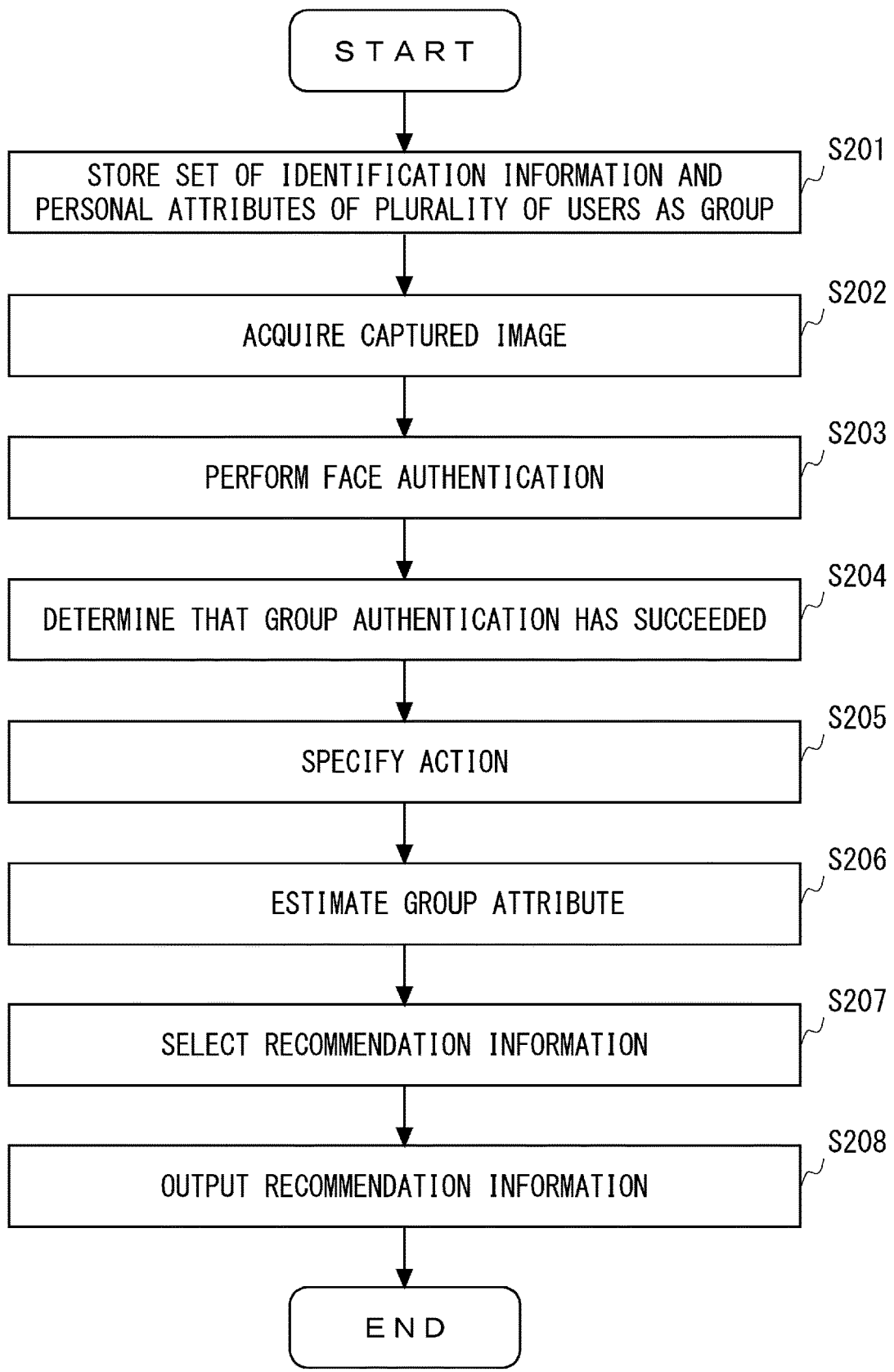
FIG. 4 is a flowchart illustrating a flow of a recommendation method according to the second example embodiment.

FIG. 4 is a flowchart illustrating a flow of a recommendation method according to the second example embodiment. First, the storage unit 120 stores a set of identification information and personal attributes of a plurality of users as a group (Step S201). Next, the acquisition unit 112 acquires a captured image obtained by imaging a plurality of persons by an imaging device installed at a predetermined point (Step S202). Next, the authentication unit 121 performs face authentication for a plurality of face regions detected from the captured image by using face feature information of a plurality of users stored in advance (Step S203). The authentication unit 121 extracts the face feature usage from the captured image, collates the face feature information included in the captured image with the face feature information registered in the face feature DB, and performs the face authentication by determining whether or not the authentication is successful based on whether or not the pieces of face feature information match each other.

Next, in a case where the face authentication using each piece of face feature information of each user belonging to the group and any one of the plurality of detected face regions has succeeded, the determination unit 115 determines that group authentication has succeeded (Step S204). Next, in a case where the group authentication has succeeded, the specifying unit 116 specifies an action in the group based on the point (Step S205). Next, the estimation unit 117 estimates a group attribute based on the personal attribute of each user belonging to the group (Step S206). Next, the selection unit 118 selects recommendation information based on the group attribute and the action (Step S207). Next, the output unit 119 outputs the selected recommendation information to a predetermined display terminal (Step S208). The recommendation device according to the present example embodiment can achieve effects similar to the effects described in the first example embodiment.

Third Example Embodiment

Figure 5:
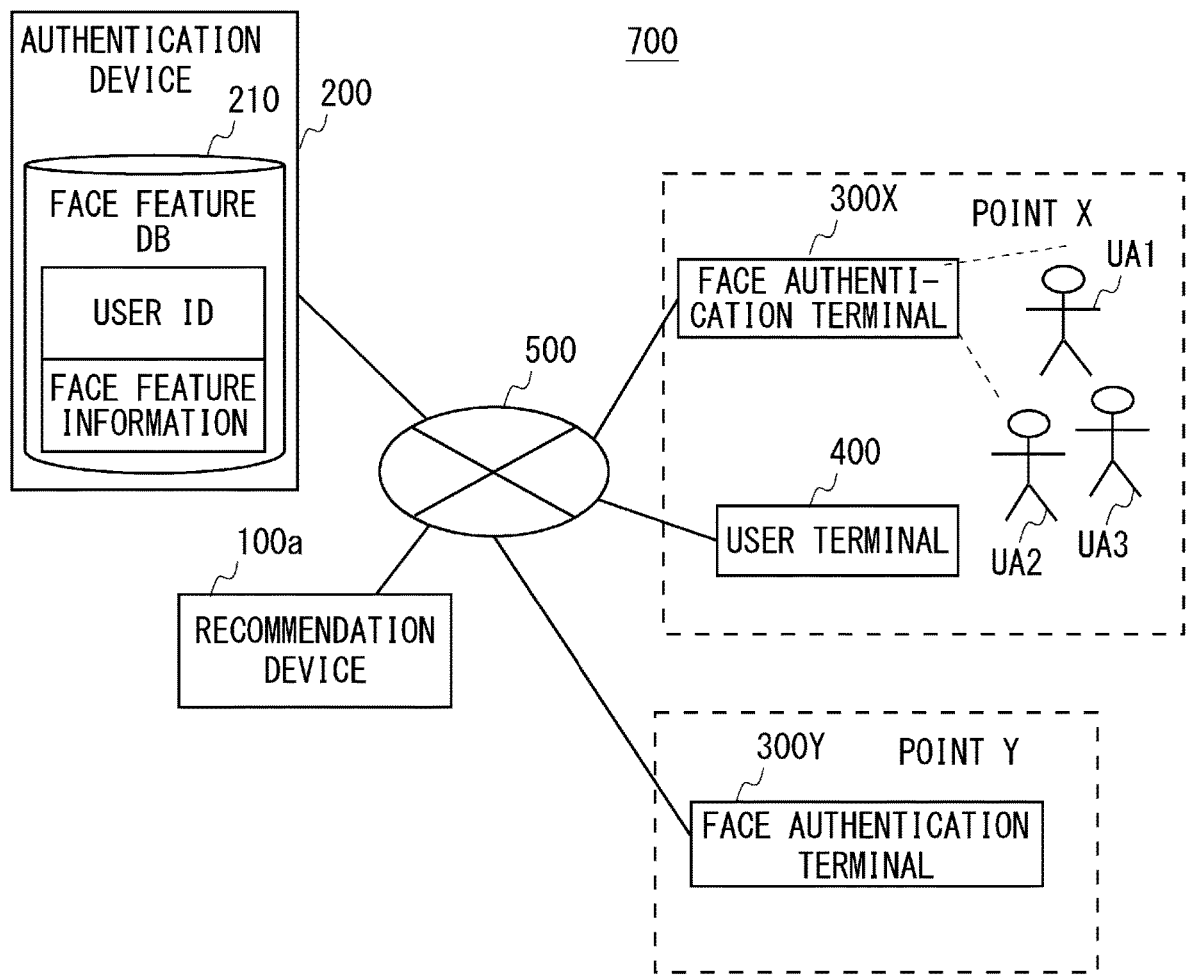
FIG. 5 is a block diagram illustrating a configuration of a recommendation system according to a third example embodiment.

A third example embodiment is a specific example of the first example embodiment described above. FIG. 5 is a block diagram illustrating a configuration of a recommendation system 700 according to the third example embodiment. The recommendation system 700 includes a recommendation device 100a, an authentication device 200, face authentication terminals 300 (300X and 300Y), and a user terminal 400. Each of the recommendation device 100a, the authentication device 200, the face authentication terminals 300 (300X and 300Y), and the user terminal 400 is connected via a network 500. Note that a description overlapping with the first example embodiment will be omitted as appropriate.

The recommendation device 100a is an information processing device that performs group authentication for a captured image obtained by imaging a plurality of persons, and in a case where the group authentication has succeeded, the recommendation device 100a selects recommendation information based on an action and a group attribute of the group and outputs the recommendation information. The recommendation device 100a is, for example, a server device implemented by a computer. The authentication device 200 is a device that performs face authentication. The authentication device 200 includes a face feature DB 210. The face feature DB 210 is a face feature database that stores a user ID and face feature information of a corresponding user in association with each other. Note that the face feature DB 210 is an example of a face feature information storage unit.

The face authentication terminal 300 is an information processing device that images a group visiting to each of points X and Y, transmits a group authentication request including a captured image obtained by imaging a plurality of persons to the recommendation device 100a, and receives and displays recommendation information in a case where the group authentication has succeeded. The face authentication terminal 300 is installed at each of the points X and Y. Specifically, the face authentication terminal 300X is installed at the point X, and the face authentication terminal 300Y is installed at the point Y. Hereinafter, it is assumed that a group of users exists at the point X as illustrated in FIG. 5. The group is an aggregate of a plurality of users. The user terminal 400 is an information processing device operated by a predetermined user. The user terminal 400 is, for example, a communication terminal such as a smartphone, a tablet, or a PC. The user terminal may perform processing similar to that of the face authentication terminal 300 or a part thereof.

Figure 6:
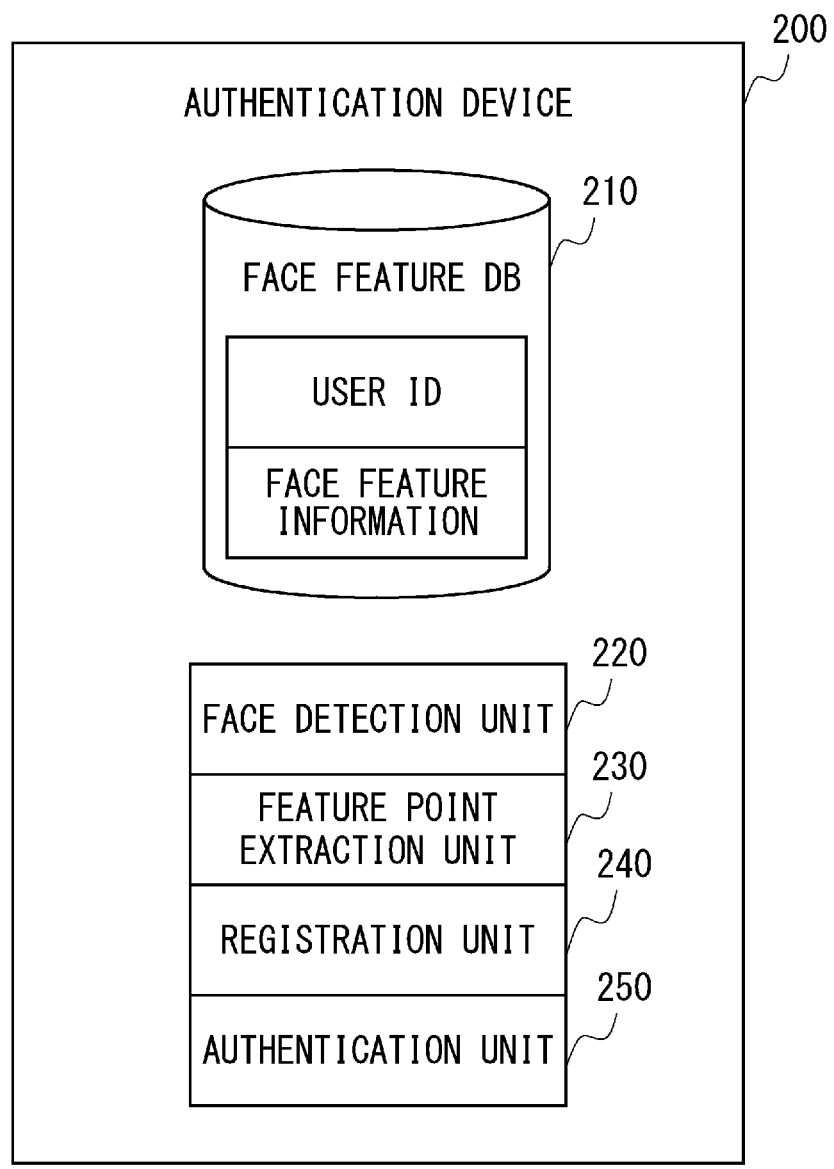
FIG. 6 is a block diagram illustrating a configuration of an authentication device.

Next, a configuration of the authentication device 200 will be described in detail with reference to FIG. 6. FIG. 6 is a block diagram illustrating a configuration of the authentication device 200. The authentication device 200 includes the face feature DB 210, a face detection unit 220, a feature point extraction unit 230, a registration unit 240, and an authentication unit 250.

The face feature DB 210 is a face feature database that stores a user ID and face feature information of a corresponding user in association with each other. The face detection unit 220 detects a face region included in a captured image and outputs the face region to the feature point extraction unit 230. The feature point extraction unit 230 extracts a feature point from the face region detected by the face detection unit 220, and outputs face feature information to the registration unit 240. The face feature information is a set of extracted feature points.

The registration unit 240 newly issues a user ID when registering the face feature information. The registration unit 240 registers the issued user ID and the face feature information extracted from the registered image in association with each other in the face feature DB 210. The authentication unit 250 collates face feature information extracted from a face image with the face feature information in the face feature DB 210. The authentication unit 250 determines that the face authentication has succeeded in a case where the pieces of face feature information match each other, and determines that the face authentication has failed in a case where the pieces of face feature information do not match each other. The authentication unit 250 transmits a result indicating the success or failure of the face authentication as a response to the recommendation device 100a. Whether or not the pieces of face feature information match each other corresponds to the success or failure of the authentication. In addition, in a case where the face authentication has succeeded, the authentication unit 250 specifies a user ID associated with the face feature information for which the authentication has succeeded, and transmits an authentication result including the specified user ID and the fact that the authentication has succeeded to the recommendation device 100a.

Figure 7:
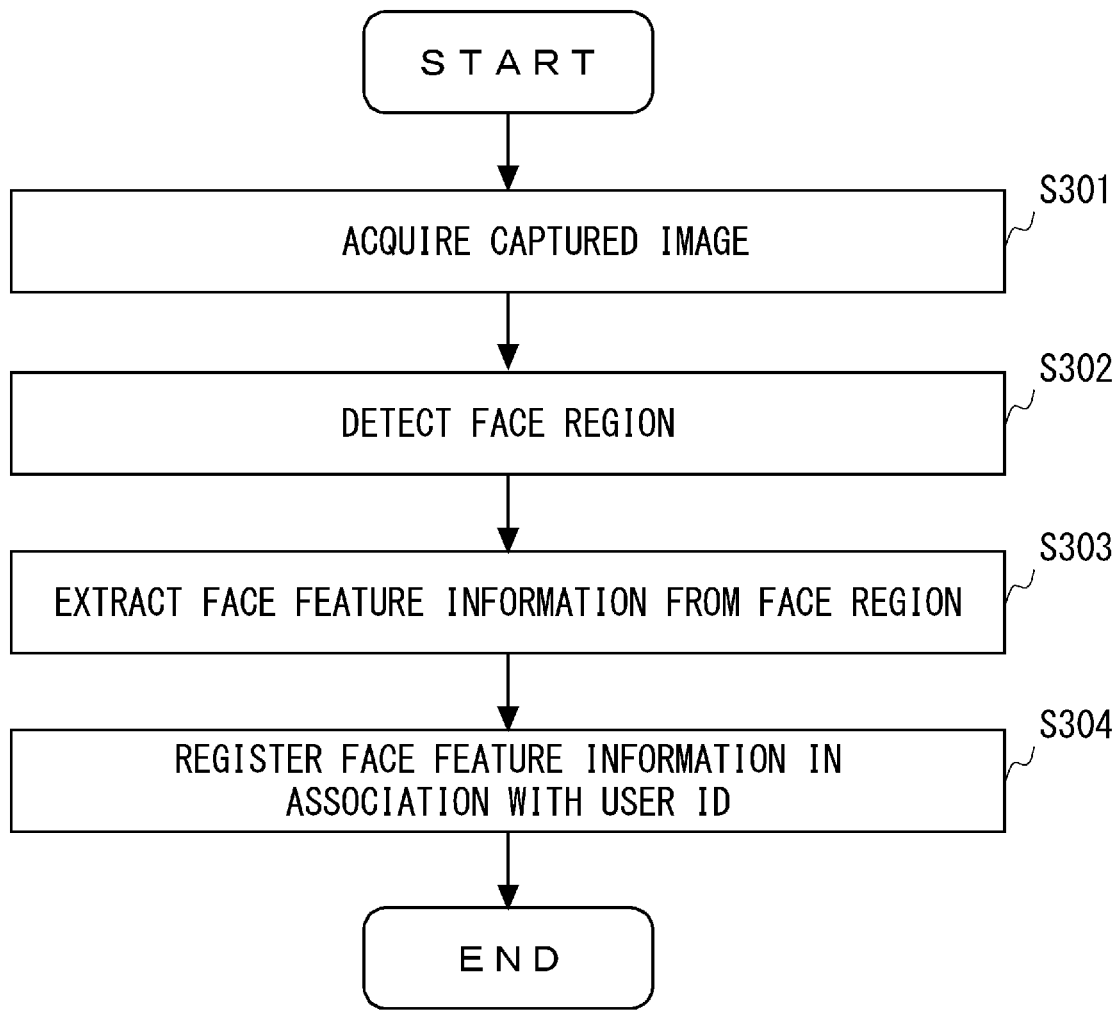
FIG. 7 is a flowchart illustrating a flow of face feature information registration processing.

An operation of the authentication device 200 when registering a user ID and face feature information in the face feature DB 210 will be described with reference to FIG. 7. FIG. 7 is a flowchart illustrating a flow of face feature information registration processing.

When registering face feature information, a face information registration terminal (not illustrated) captures an image including a face of a user as a registration image, and transmits a face feature information registration request to the authentication device 200 via the network 500. The face information registration terminal is, for example, an information processing device such as a personal computer, a smartphone, or a tablet terminal. The face information registration terminal is, for example, the user terminal 400. The face feature information registration request includes the registration image. First, the authentication device 200 acquires the registration image included in the face feature information registration request from the face information registration terminal via the network 500 (Step S301).

Next, the face detection unit 220 detects a face region included in the registration image (Step S302), and outputs the detected face region to the feature point extraction unit 230. Next, the feature point extraction unit 230 extracts a feature point from the face region and outputs face feature information to the registration unit 240 (Step S303). Next, the registration unit 240 issues a user ID corresponding to the output face feature information, and registers the user ID and the face feature information in association with each other in the face feature DB 210 (Step S304).

Figure 8:
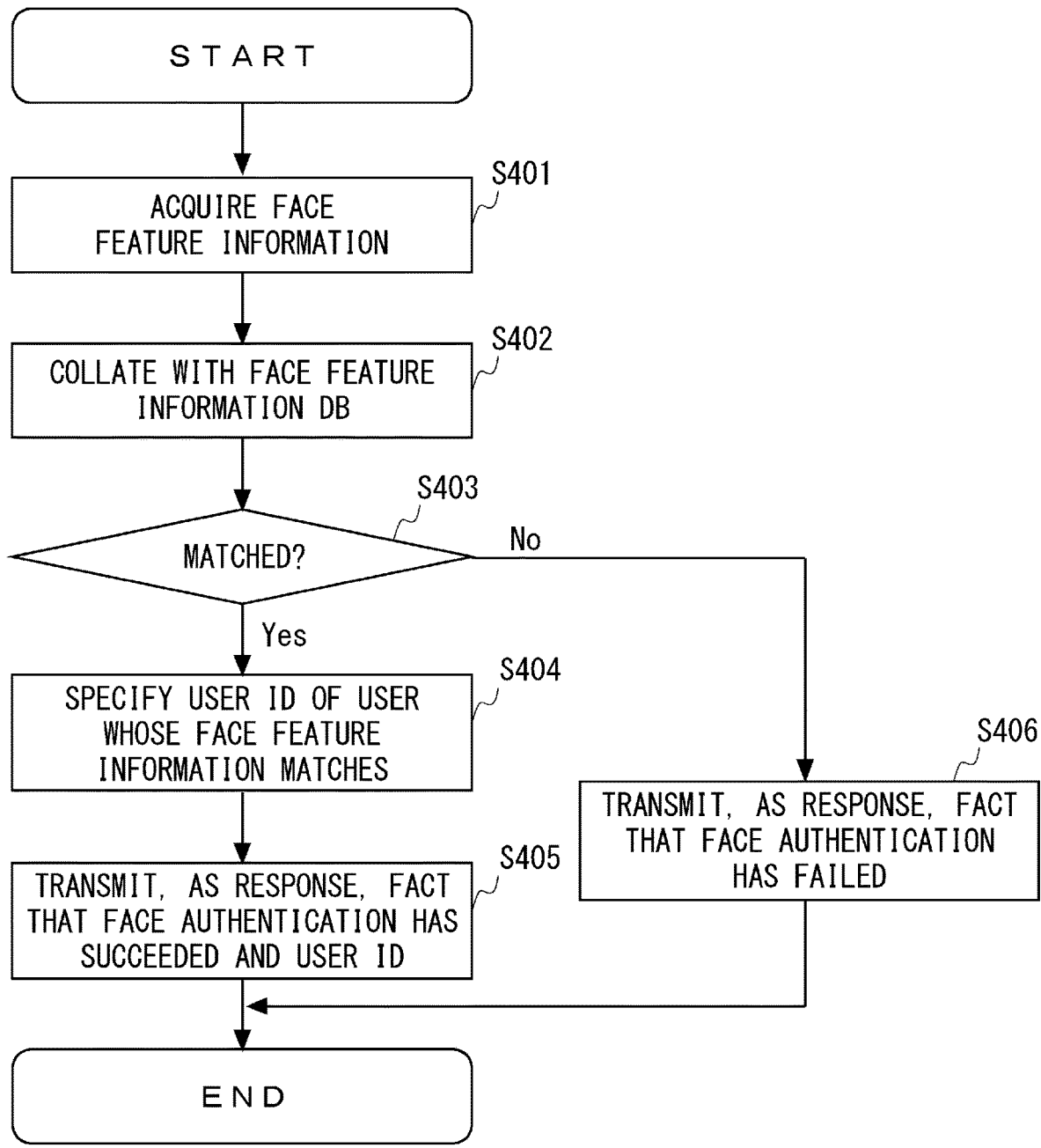
FIG. 8 is a flowchart illustrating a flow of face authentication processing.

An operation of the authentication device 200 when performing the face authentication will be described with reference to FIG. 8. FIG. 8 is a flowchart illustrating a flow of face authentication processing. When performing the face authentication, the face authentication terminal 300 captures, as an authentication image, an image including a face of a user, and transmits a face authentication request to the recommendation device 100a via the network 500. The face authentication request includes the authentication image. First, the recommendation device 100a transmits a face region or face feature information extracted from the authentication image to the authentication device 200. The feature point extraction unit 230 acquires the face feature information by extracting the face feature information from the received face region or by receiving the face feature information (Step S301).

Next, the authentication unit 250 collates the acquired face feature information with that in the face feature DB 210 (Step S302). In a case where the pieces of face feature information match each other (Yes in Step S303), the authentication unit 250 specifies a user ID of the user whose face feature information matches (Step S304), and transmits, as a response, the fact that the face authentication has succeeded and the specified user ID to the recommendation device 100a (Step S305). In a case where there is no face feature information that matches with the acquired face feature information (No in Step S303), the authentication unit 250 transmits, as a response, the fact that the face authentication has failed to the recommendation device 100a (Step S306). The authentication device 200 can estimate the age group and gender of the user based on the face feature information. In Step S306, the authentication unit 250 transmits, as a response, the estimated age group and gender to the recommendation device 100a.

Next, a configuration of the face authentication terminal 300 will be described in detail with reference to FIG. 9. The face authentication terminal 300 includes an imaging device such as a camera, a display device, and a computer as hardware components. The face authentication terminal 300 is a device that requests for group authentication by face authentication. Examples of the face authentication terminal 300 include, but are not limited to, a terminal that performs payment by face authentication, a terminal that performs entrance control by face authentication, a digital signage that presents information according to face authentication, and the like.

Figure 9:
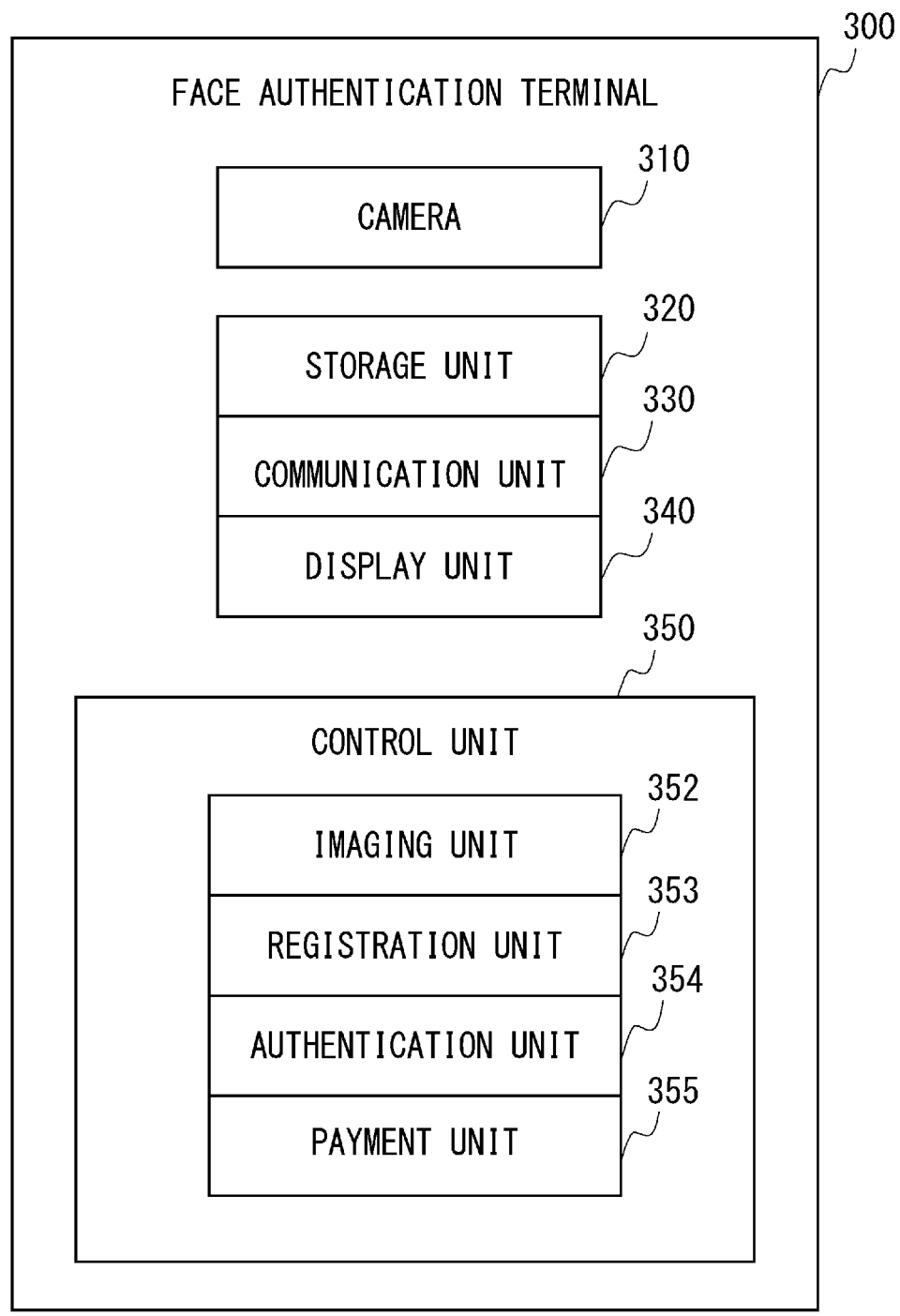
FIG. 9 is a block diagram illustrating a configuration of a face authentication terminal.

FIG. 9 is a block diagram illustrating a configuration of the face authentication terminal 300. The face authentication terminal 300 includes a camera 310, a storage unit 320, a communication unit 330, a display unit 340, and a control unit 350. The camera 310 is an imaging device that captures an image. The storage unit 320 is a storage device that stores a program for implementing each function of the face authentication terminal 300. The communication unit 330 is a communication interface with the network 500. The display unit 340 is a display device that displays a group authentication result, recommendation information, and the like to a user. The control unit 350 controls hardware included in the face authentication terminal 300. The control unit 350 includes an imaging unit 352, a registration unit 353, an authentication unit 354, and a payment unit 355.

The imaging unit 352 transmits an imaging request to the camera 310. The camera 310 captures an image including a face of each user included in a group. The image captured by the camera 310 is used as the registration image and the authentication image. The registration unit 353 transmits the face feature information registration request to the authentication device 200 via the network 500. The face feature information registration request includes the registration image captured by the camera 310. The authentication unit 354 transmits the group authentication request to the recommendation device 100a via the network 500. The group authentication request includes the authentication image captured by the camera 310. The authentication unit 354 receives a result indicating the success or failure of the group authentication from the recommendation device 100a, and causes the display unit 340 to display the result.

The payment unit 355 performs the payment processing in a case where the group authentication has succeeded. Note that the control unit 350 may include a recording unit (not illustrated) instead of the payment unit 355. The recording unit records entrance and leaving of each user to and from a facility where the face authentication terminal 300 is installed in a case where the group authentication has succeeded.

Figure 10:
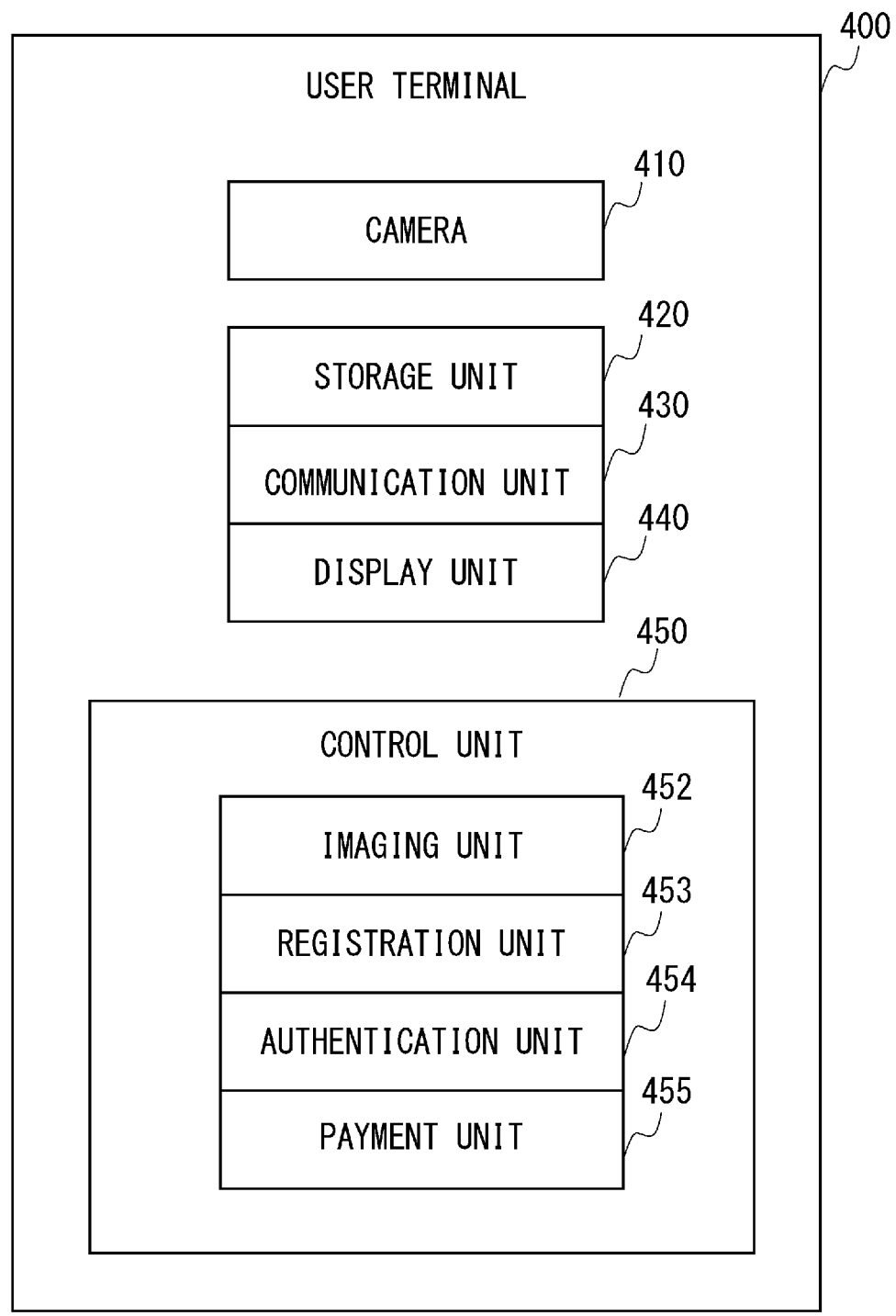
FIG. 10 is a block diagram illustrating a configuration of a user terminal.

Next, a configuration of the user terminal 400 will be described in detail with reference to FIG. 10. FIG. 10 is a block diagram illustrating a configuration of the user terminal 400. The user terminal 400 includes a camera 410, a storage unit 420, a communication unit 430, a display unit 440, and a control unit 450. The control unit 450 includes an imaging unit 452, a registration unit 453, an authentication unit 454, and a payment unit 455. Since the function of each component included in the user terminal 400 is similar to that of each component included in the face authentication terminal 300, a description thereof will be omitted.

The face authentication terminal 300 and the user terminal 400 have a function of transmitting the face feature information registration request and the group registration request. A flow of face feature information registration processing and group registration processing will be described below. Note that a case where the user terminal 400 performs the face feature information registration processing and the group registration processing will be described, but the face authentication terminal 300 may perform similar processing.

First, the face feature information registration processing will be described. First, the imaging unit 452 controls the camera 410 to capture a registration image of a user. Next, the registration unit 453 transmits a face feature information registration request including a face region extracted from the registration image to the authentication device 200 via the network 500. Finally, the registration unit 453 receives the face authentication result from the authentication device 200. Note that the registration unit 453 may transmit a face information registration request including face feature information extracted from the registration image to the authentication device 200.

Next, the group registration processing will be described. First, the user terminal 400 individually performs the face information registration processing described above according to an operation of each user included in a group. Next, the user terminal 400 transmits a group registration request to the recommendation device 100a according to an operation of an arbitrary user in the group, and registers the definition of the member belonging to the group.

Figure 11:
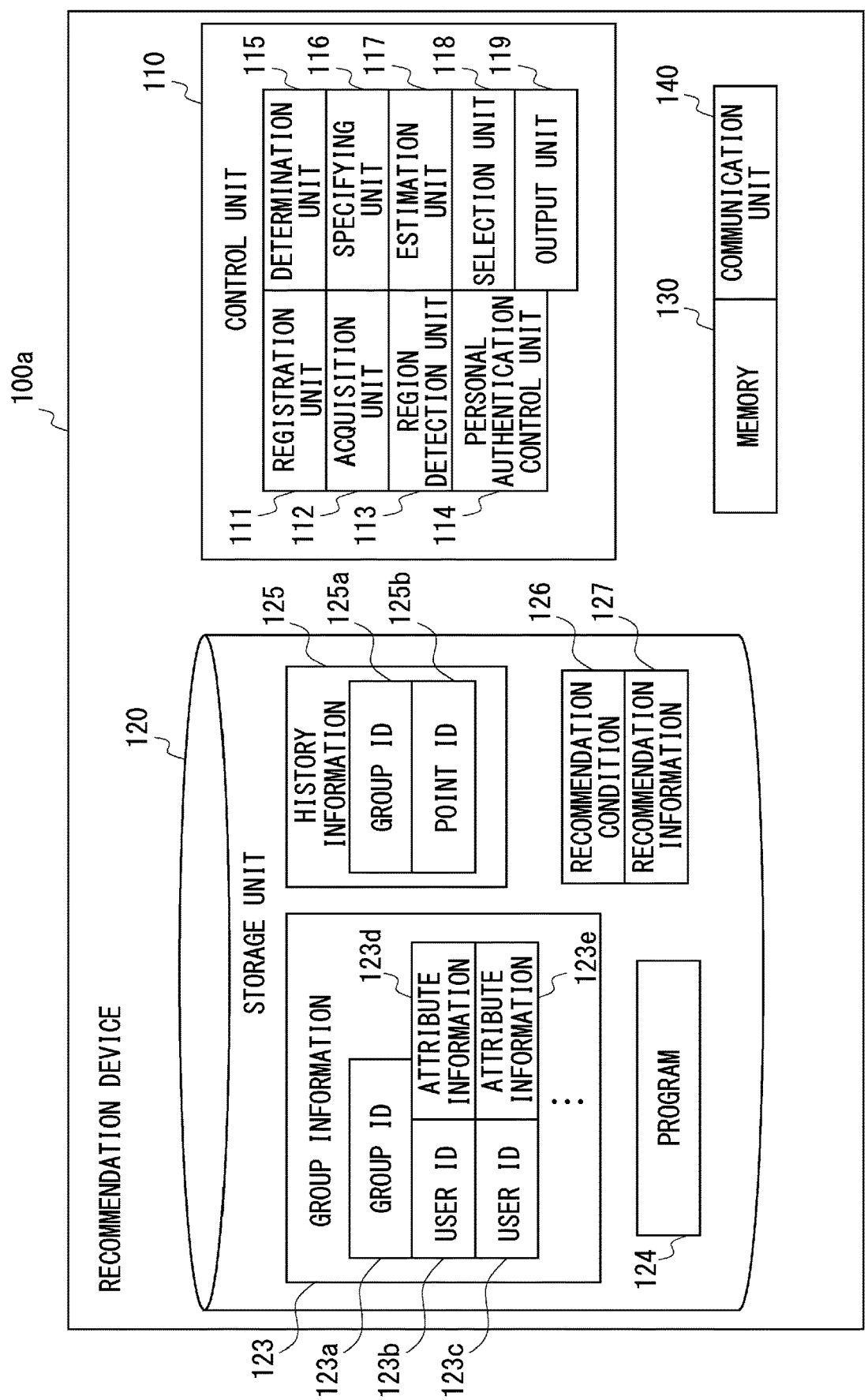
FIG. 11 is a block diagram illustrating a configuration of a recommendation device.

Next, a configuration of the recommendation device 100a will be described in detail with reference to FIG. 11. FIG. 11 is a block diagram illustrating a configuration of the recommendation device 100a. The recommendation device 100a includes a control unit 110, a storage unit 120, a memory 130, and a communication unit 140.

The storage unit 120 is a storage device that stores group information 123, a program 124, history information 125, a recommendation condition 126, and recommendation information 127. The group information 123 is information in which a user ID of each user included in a group is associated with a group ID 123a. The group ID 123a is identification information that enables identification of the group. The user ID is identification information that enables identification of the user, and is, for example, a name, a telephone number, an e-mail address, an arbitrary identification number, or the like. User IDs 123b and 123c are associated with attribute information 123d and 123e, respectively. That is, in the storage unit 120, identification information of a plurality of users belonging to a group and personal attribute information of each user are associated with identification information of the group. Examples of the attribute information 123d and 123e include a gender, an age, a hobby, physical information, and the like, but are not limited thereto. Hereinafter, each of the attribute information 123d and 123e associated with each user ID may be referred to as a "personal attribute". The program 124 is a computer program in which the recommendation processing according to the present example embodiment is implemented. The history information 125 is information in which a group ID 125a and a point ID are associated with each other. The point ID is identification information of a point where the face authentication terminal 300 is installed.

The recommendation information 127 is associated with the recommendation condition 126. The recommendation condition 126 is a combination of a group attribute and a point ID. The recommendation information 127 is information presented in a case where the associated recommendation condition 126 is satisfied. The recommendation information 127 is, for example, presentation information presented for guiding to a predetermined point, presentation information presented for guiding to a point different from the current point, or the like.

The memory 130 is a storage region for temporarily storing processing contents of the control unit 110, and is, for example, a volatile storage device such as a random access memory (RAM). The communication unit 140 is an interface that communicates with the outside of the recommendation device 100a.

The control unit 110 includes a registration unit 111, an acquisition unit 112, a region detection unit 113, a personal authentication control unit 114, a determination unit 115, a specifying unit 116, an estimation unit 117, a selection unit 118, and an output unit 119. The control unit 110 is a control device that controls the operation of the recommendation device 100a, and is, for example, a processor such as a CPU. The control unit 110 reads the program 124 from the storage unit 120 into the memory 130 and executes the program 124. As a result, the control unit 110 implements the functions as the registration unit 111, the acquisition unit 112, the region detection unit 113, the personal authentication control unit 114, the determination unit 115, the specifying unit 116, the estimation unit 117, the selection unit 118, and the output unit 119.

The registration unit 111 receives the group registration request from the face authentication terminal 300 or the user terminal 400 via the network 500. The registration unit 111 issues the group IDs 123a corresponding to a plurality of user IDs included in the received group registration request. The registration unit 111 generates the group information 123 in which the user IDs 123b and 123c are associated with the issued group ID 123a, and registers the group information 123 in the storage unit 120.

In a case where a group ID and one or more user IDs are included in the group registration request, the registration unit 111 may search the storage unit 120 for the group ID included in the received group registration request. In such a case, the registration unit 111 further associates the user ID included in the received group registration request with the found group ID, and updates the group information 123. Note that the group registration processing is not limited thereto.

The acquisition unit 112 acquires a captured image from the imaging device. Note that it is assumed that the captured image includes face regions of a plurality of persons. The region detection unit 113 detects a face region from the captured image. For example, the region detection unit 113 analyzes the captured image to recognize a plurality of face regions. In a case where a plurality of face regions have been specified, the personal authentication control unit 114 causes the authentication device 200 to perform face authentication using a set of face feature information for each specified face region.

The determination unit 115 determines whether or not the group authentication is successful. In a case where the face authentication using each piece of face feature information of each user belonging to the group and any one of the plurality of detected face regions has succeeded, the determination unit 115 determines that group authentication has succeeded. In a case where the face authentication has succeeded for at least one of the users belonging to the group, and the face authentication has failed for the other users, the determination unit 115 determines whether or not the group authentication is successful based on the age group and gender of the user received from the authentication device 200. In this case, the determination unit 115 collates the attribute information 123d and 123e associated with the group ID 123a of the group to which the user whose face authentication has succeeded belongs with the age group and gender of each user received from the authentication device 200, and determines whether or not the group authentication is successful based on whether or not the attribute information and the age group and gender match each other. In a case where the group authentication has succeeded, the determination unit 115 registers, as the history information 125 in the storage unit 120, the point ID of the point for which the group authentication has succeeded and in which the imaging device is installed.

Note that, in a case where the face authentication has failed for at least one of the plurality of face regions, the determination unit 115 may extract the face feature information from the face region for which the face authentication has failed, and estimate the attribute information (for example, the age group and gender) of the user based on the extracted face feature information. In this case, the determination unit 115 may collate the estimated attribute information of the user with the attribute information 123d and 123e of other users associated with the group ID 123a of the group to which the user whose face authentication has succeeded belongs, and determine that the group authentication has succeeded in a case where a certain number or more of pieces of the attribute information match. In other words, in a case where the face authentication of some users belonging to the group has succeeded and the face authentication of other users has failed, the determination unit 115 may estimate the personal attribute based on the face region for which the face authentication has failed. In this case, the determination unit 115 determines whether or not the group authentication is successful according to the degree of matching between the estimated personal attribute and the personal attribute of each user belonging to the group.

For example, it is assumed that, in a case where face authentication is performed for a group including a couple and one child, pieces of face feature information of the couple (father and mother) are registered in advance and face feature information of the child is not registered. In a case where the face authentication is performed with a captured image including the faces of the family of three, the face authentication of the couple succeeds, but the face authentication of the child fails. At this time, the ages and genders of the couple are specified by the face authentication, and the age of the child is estimated based on the face feature information extracted from the captured image. Therefore, even in a case where the face feature information of the child is unregistered, the recommendation device 100a can estimate that the group attribute of the group is a family of three.

In addition, in a case where each face region for which the face authentication using the face feature information of each user belonging to the group has succeeded is within a predetermined range, the determination unit 115 may register the point ID of the point as the history information 125 in the storage unit 120. That is, the determination unit 115 may authenticate only users close to each other to some extent as a group. For example, in a case where users who do not belong to a group unintentionally appear in the same frame, it is inappropriate to authenticate all users appearing in the captured image as one group. By authenticating only users close to each other to some extent as a group, the accuracy of the group authentication can be improved.

In a case where the group authentication has succeeded, the specifying unit 116 specifies an action of the group. The specifying unit 116 specifies the action of the group by referring to the point ID 125b registered as the history information 125 in the storage unit 120. The estimation unit 117 estimates a group attribute based on the personal attribute of each user belonging to the group. The selection unit 118 selects recommendation information based on the group attribute estimated by the estimation unit 117 and the action specified by the specifying unit 116. The output unit 119 outputs the recommendation information selected by the selection unit 118 to a predetermined display terminal. The display terminal is, for example, the face authentication terminal 300, the user terminal 400, a signage, or the like.

Figure 12:
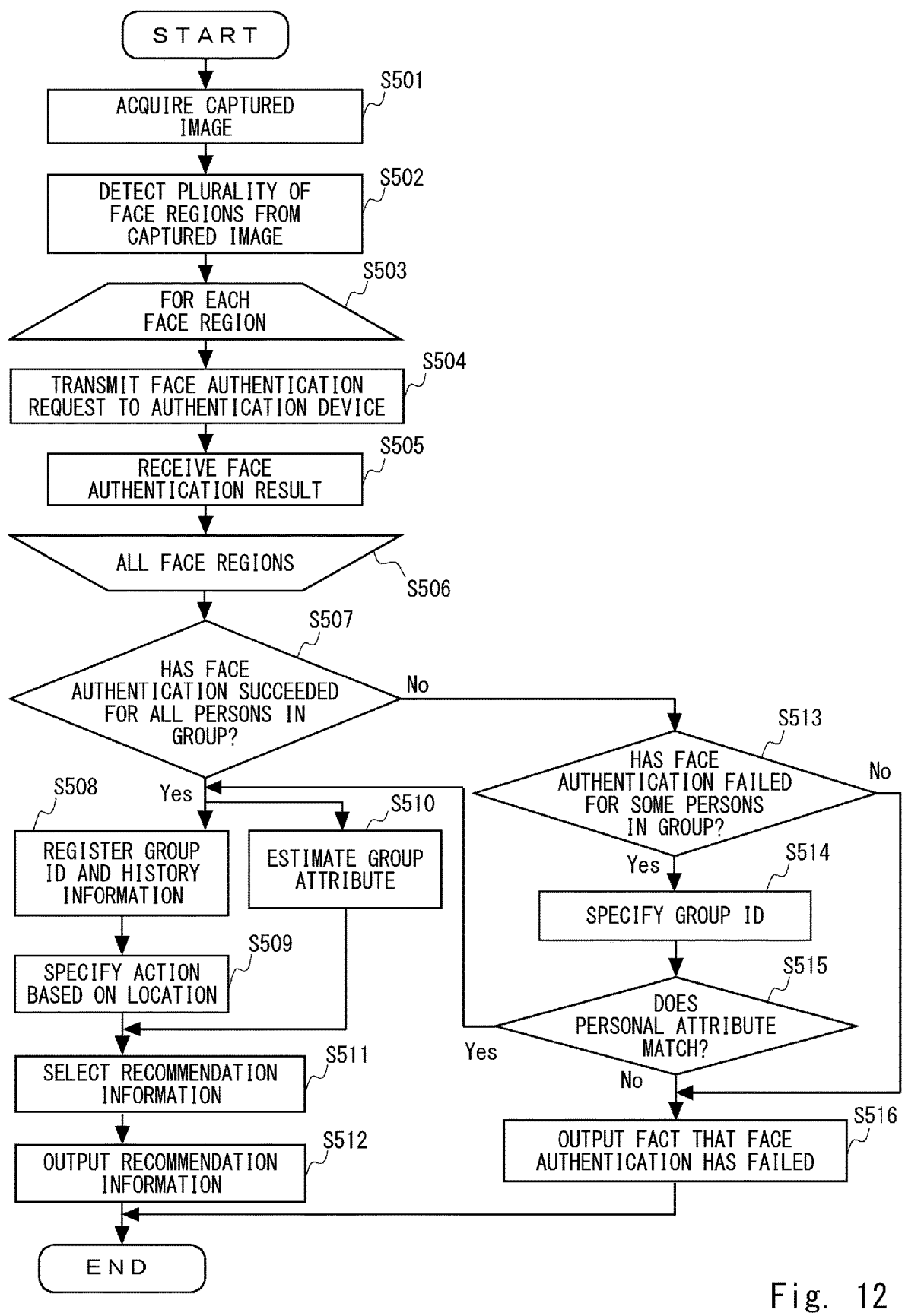
FIG. 12 is a flowchart illustrating a flow of recommendation processing.

Next, an operation of the recommendation device 100a at the time of recommendation processing will be described with reference to FIG. 12. FIG. 12 is a flowchart illustrating a flow of the recommendation processing. A case where a user ID of a user UA1, a user ID of a user UA2, and a user ID of a user UA3 are registered in association with each other as a group A in the storage unit 120 will be described.

First, the acquisition unit 112 included in the recommendation device 100a acquires a captured image from the imaging device (Step S501). Next, the region detection unit 113 detects a plurality of face regions from the captured image (Step S502). Next, the personal authentication control unit 114 causes the authentication device 200 to perform the face authentication for each specified face region, and receives the face authentication result (Steps S503 to S506).

After the face authentication is performed for all the face regions specified in Step S502, the determination unit 115 determines whether or not the face authentication has succeeded for all the users belonging to the group (Step S507). For example, in a case where the ID of the user UA1, the ID of the user UA2, and the ID of the user UA3 have been received as the face authentication result, the determination unit 115 determines that the face authentication has succeeded for all the users belonging to the group.

In a case where the face authentication has succeeded for all the users belonging to the group (Yes in Step S507), the determination unit 115 registers, in the storage unit 120, the point ID of the point for which the group authentication has succeeded and in which the imaging device is installed as the history information 125 associated with the group ID 125a (Step S508). Next, the specifying unit 116 specifies an action of the group by referring to the point ID 125b registered as the history information 125 in the storage unit 120 (Step S509). In a case where the face authentication has succeeded for all the users belonging to the group (Yes in Step S507), the estimation unit 117 estimates a group attribute based on a personal attribute of each user belonging to the group (Step S510).

Next, the selection unit 118 selects recommendation information based on the group attribute estimated in Step S510 and the action specified in Step S509 (Step S511).

Next, the output unit 119 outputs the recommendation information selected in Step S511 to a predetermined display terminal (Step S512).

In a case where there is a user whose face authentication has failed among the users belonging to the group (No in Step S507), the determination unit 115 determines whether or not the face authentication has failed only for some of the users belonging to the group (Step S513). A state in which the face authentication has failed only for some of the users belonging to the group is a state in which the face authentication has succeeded for at least one of the users belonging to the group and the face authentication has failed for the other users. For example, in a case where the user ID of the user UA1 and the user ID of the user UA2 have been received as the face authentication result, and the user ID of the user UA3 is not received, the determination unit 115 determines that the face authentication has failed for only some of the users belonging to the group. For example, in a case where none of the ID of the user UA1, the ID of the user UA2, and the ID of the user UA3 has been received as the face authentication result, the determination unit 115 determines that the face authentication has failed for all the users belonging to the group.

In a case where the face authentication of the user has failed, the authentication device 200 estimates the age group and gender of the user based on the face feature information, and transmits, as a response, the estimation result to the recommendation device 100*a*. In a case where the face authentication has failed for only some of the users belonging to the group (Yes in Step S513), the determination unit 115 specifies the group ID 123*a* including the user IDs 123*b* and 123*c* of the users whose face authentication has succeeded (Step S514). Next, the determination unit 115 collates the personal attribute associated with the group ID 123*a* specified in Step S514 with the age group and gender of the user received from the authentication device 200 (Step S515).

In a case where the personal attribute matches (Yes in Step S515), the recommendation device 100*a* outputs recommendation information according to the procedures illustrated in Steps S508 to S512. In a case where the personal attribute does not match (No in Step S515), the output unit 119 outputs the fact that the face authentication has failed (Step S516). The output destination in Step S516 may be the user terminal 400 operated by the user whose face authentication has succeeded, or may be a display terminal that does not depend on the user, such as the face authentication terminal 300 or a signage.

The determination unit 115 may specify a user whose face authentication has failed based on a difference between the user IDs 123*b* and 123*c* of all the users belonging to the group and the user ID of the user whose face authentication has succeeded. Then, the output unit 119 may output the fact that the face authentication has failed for a specific user to the user terminal 400 operated by the user. In addition, the output unit 119 may notify the user of the reason why the group authentication has failed. The reason why the group authentication has failed is, for example, that the user is away from other users belonging to the group, that the face authentication of the user has failed, and the like. Here, the determination unit 115 may notify the user of re-imaging guidance in such a way that the user approaches other users belonging to the group or faces the camera.

In a case where the face authentication has failed for all the users belonging to the group (No in Step S513), the output unit 119 outputs the fact that the face authentication has failed (Step S516). The output destination in this case is, for example, a display terminal that does not depend on the user, such as the face authentication terminal 300 and a signage.

Note that the output destination of the recommendation information in Step S512 may be a display device installed at a point different from the point where the action of the group has been specified. Furthermore, the output of the recommendation information (Step S512) may be performed immediately after the recommendation information is selected (Step S511), or may be performed after a while. That is, a timing at which the recommendation information is output may deviate from a timing at which the recommendation information is selected. For example, it is assumed that a group visits a bowling alley and an image including faces is captured with a signage or the like installed in the bowling alley. At this time, the recommendation device 100*a* causes the face authentication to be performed based on the captured image, and selects recommendation information based on a group attribute and an action of the group. When the face authentication is performed in a signage installed in a facility or on a road that the group visited next time, the recommendation device 100*a* outputs the selected recommendation information to the signage. In this manner, the recommendation information may be output to a signage installed at a point different from the bowling alley.

Hereinafter, specific examples of the recommendation condition 126 and the corresponding recommendation information 127 will be described. For example, in a case where the recommendation condition 126 is that "the group attribute indicates that only young people are included, and the point ID is an ID of a bowling alley", the recommendation information 127 is "guidance information to an all-you-can-eat restaurant". A group staying in a bowling alley is considered to have a meal after playing blowing. In addition, a group including only young people is considered to prefer an all-you-can-eat restaurant.

In a case where the recommendation condition 126 is "the group attribute indicates that only females are included, and the point ID is an ID of a bookstore", the recommendation information 127 is "guidance information to a predetermined cafe". A group staying in a bookstore is considered to take a break after visiting the bookstore. In addition, a group including only females is considered to prefer a cafe as a rest place. In a case where the recommendation condition 126 is that "the group attribute indicates an elderly couple, and the point ID is an ID of a station", the recommendation information 127 is "guidance information to a restaurant directly connected to the station". A group staying in a station is considered to have a meal after visiting the station. In addition, a group of an elderly couple is considered to prefer a restaurant near the current location.

In a case where the recommendation condition 126 is that "the group attribute indicates that only males are included, and the point ID is an ID of an automobile showroom", the recommendation information 127 is "guidance information to a restaurant of a foreign car manufacturer". A group staying in an automobile showroom is considered to take a break after visiting the automobile showroom. In addition, a group including only males and visiting an automobile showroom is considered to be an automobile lover. In a case where the recommendation condition 126 is that "the group attribute indicates a married couple with a child, and the point ID is an ID of a park", the recommendation information 127 is "guidance information to a cafe where a children's chair is provided around the park". It is considered that a group staying in a park will enter a shop where drinks can be purchased. In addition, a group with children is considered to prefer a store in which a children's chair is provided.

The recommendation information 127 of each specific example described above may be "presentation of a discount coupon usable in a store" or the like. Presenting the recommendation information 127 corresponding to a group satisfying the above-described recommendation condition 126 is presenting the recommendation information 127 matching the demand and preference of the group. Therefore, it is possible to increase the utilization rate of the presented recommendation information 127.

Fourth Example Embodiment

A fourth example embodiment is a modification of the third example embodiment described above. In the fourth example embodiment, the face authentication terminal 300 records an action history of a group. The action history is a history of actions performed by the group. Examples of the action history include a payment history for a product or the like, an entrance/leaving history for a facility, a participation history for an event, and the like. The action history may include information such as a time and place at which the user has performed the action.

Figure 13:
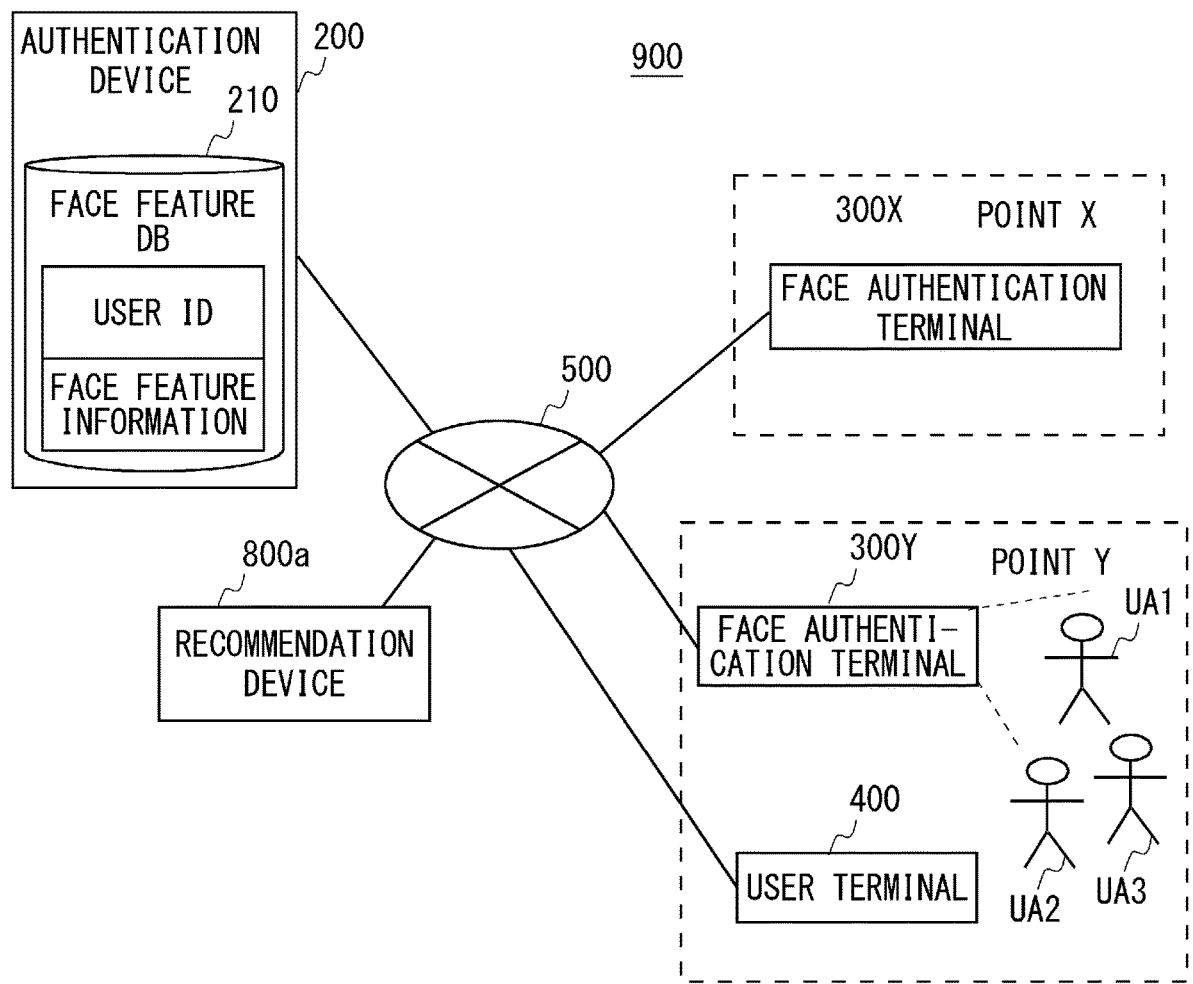
FIG. 13 is a block diagram illustrating a configuration of a recommendation system according to a fourth example embodiment.
Figure 14:
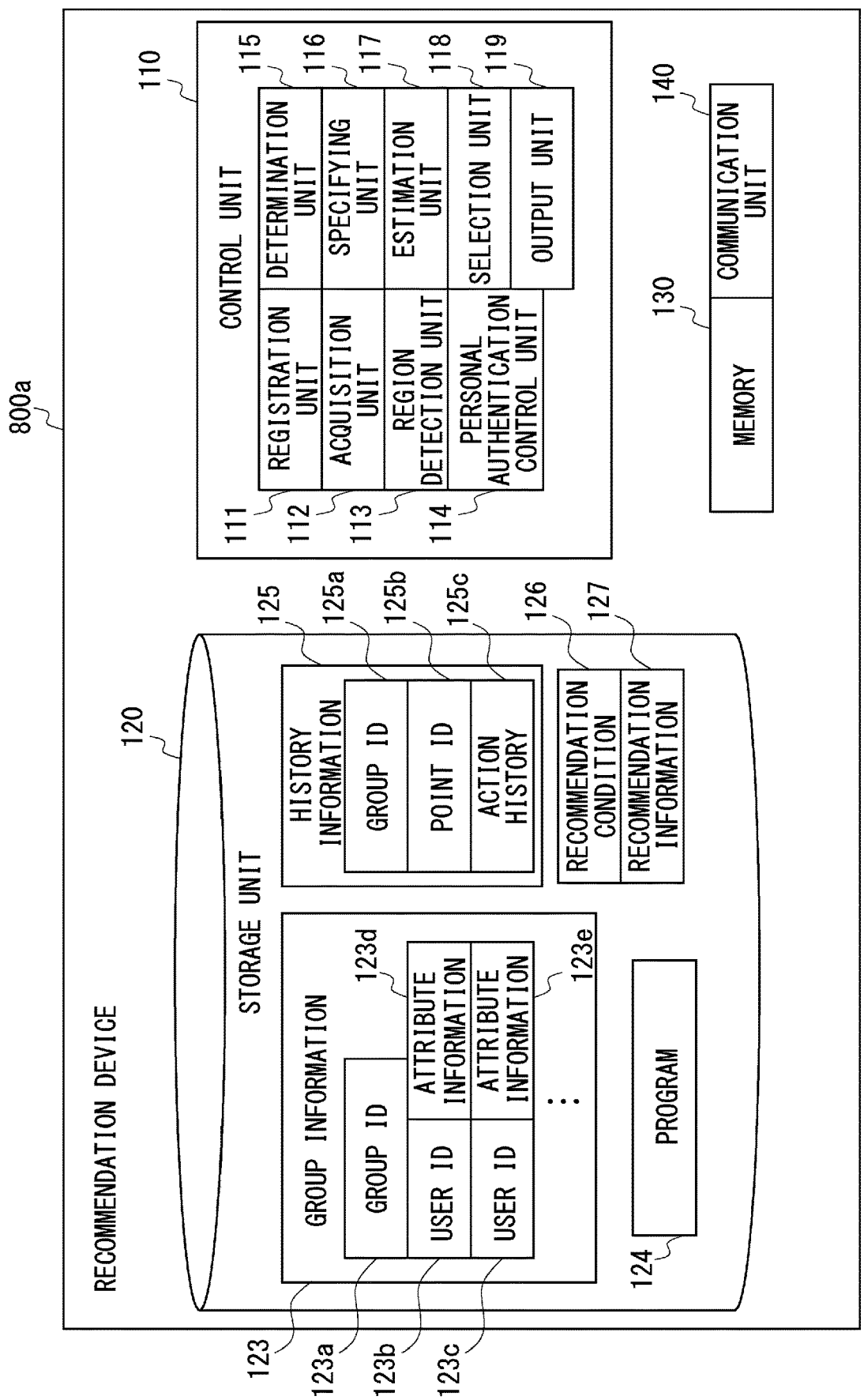
FIG. 14 is a block diagram illustrating a configuration of a recommendation device according to the fourth example embodiment.

FIG. 13 is a block diagram illustrating a configuration of a recommendation system 900 according to the fourth example embodiment. In the recommendation system 900, the recommendation device 100a in the configuration of the recommendation system 700 illustrated in FIG. 5 is replaced with a recommendation device 800a. For each component included in the recommendation system 900, a description overlapping with that of the third example embodiment will be omitted as appropriate. FIG. 14 is a block diagram illustrating a configuration of the recommendation device according to the fourth example embodiment. The recommendation device 800a is different from the recommendation device 100a in that the history information 125 recorded in the storage unit 120 includes the action history. Since the other components are similar, a description thereof will be omitted as appropriate.

In the present example embodiment, the face authentication terminal 300 also serves as an action history recording terminal. The action history recording terminal is a terminal that records an action history of a group. The action history is a history of actions performed by the group. Examples of the action history include a payment history for a product or the like, an entrance/leaving history for a facility, a participation history for an event, and the like. The action history may include information such as a time and place at which the group has performed the action. The action history is recorded as the history information 125 associated with the group ID 125a in the storage unit 120. In the present example embodiment, the recommendation condition 126 is a combination of at least one of the point ID or the action history, and the group attribute.

Figure 15:
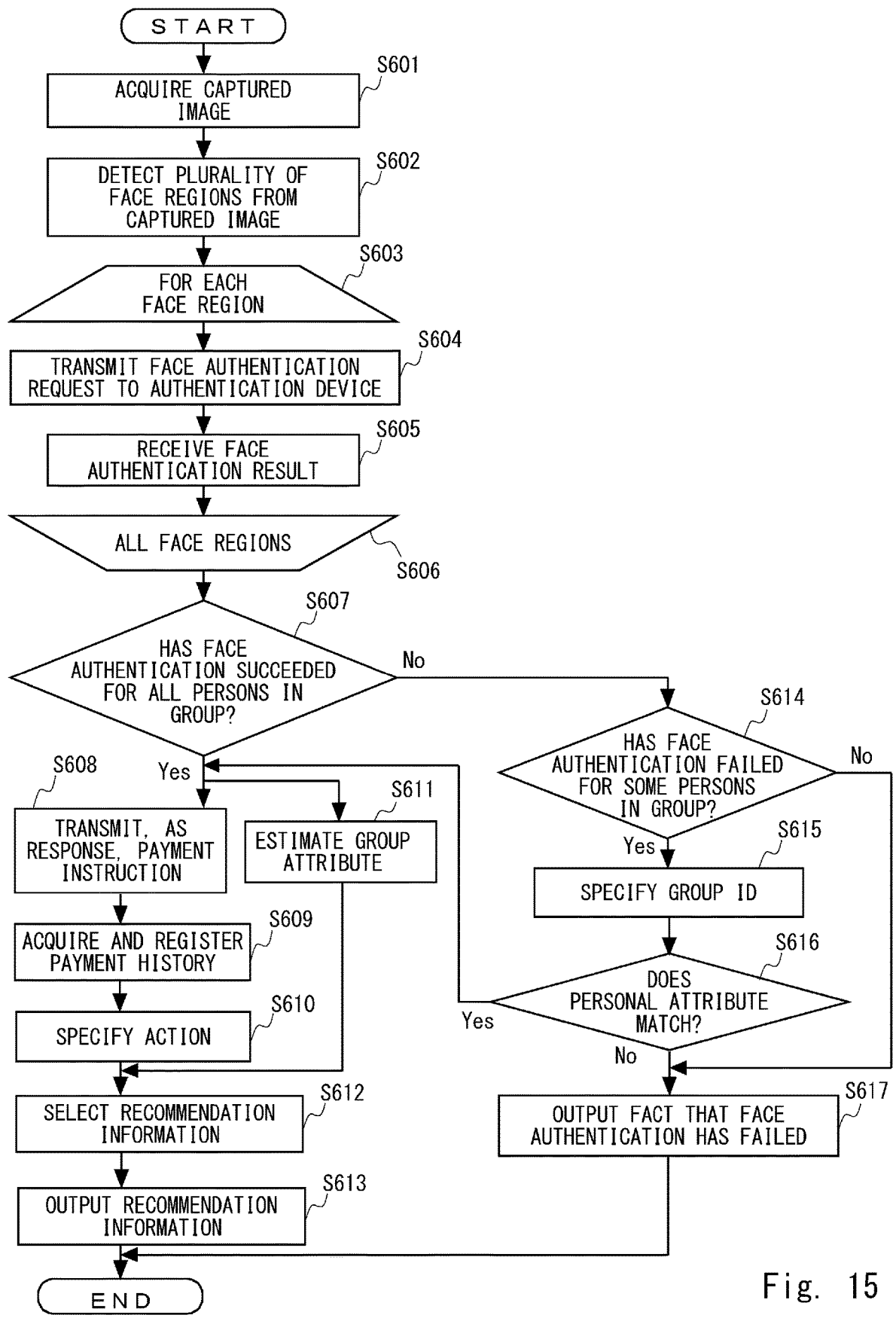
FIG. 15 is a flowchart illustrating a flow of recommendation processing.

Next, an operation of the recommendation device 800a at the time of recommendation processing will be described with reference to FIG. 15. FIG. 15 is a flowchart illustrating a flow of the recommendation processing. Note that, in the example illustrated in FIG. 15, it is assumed that the face authentication terminal 300 performs the payment processing in a case where the face authentication has succeeded.

The face authentication terminal 300 captures a captured image including face regions of a plurality of users, and transmits a group authentication request including the captured image to the recommendation device 800a. The group authentication request includes a payment request. Once the group authentication request is received, the acquisition unit 112 included in the recommendation device 800a acquires the captured image included in the group authentication request (Step S601). Next, the region detection unit 113 detects the plurality of face regions from the captured image (Step S602). Next, the personal authentication control unit 114 causes the authentication device 200 to perform the face authentication for each specified face region, and receives the face authentication result (Steps S603 to S606). After the face authentication is performed for all the face regions specified in Step S602, the determination unit 115 determines whether or not the face authentication has succeeded for all the users belonging to the group (Step S607).

In a case where the face authentication has succeeded for all the users belonging to the group (Yes in Step S607), the output unit 119 transmits, as a response, an instruction for the payment processing to the face authentication terminal 300 (Step S608). Note that the instruction for the payment processing may include the user IDs 123b and 123c of the users who make payment. Once the instruction for the payment processing is received, the face authentication terminal 300 performs the payment processing and transmits, as a response, a payment history that is a result of the payment to the recommendation device 800a. The payment history includes a group ID. The registration unit 111 acquires the payment history received from the face authentication terminal 300 and the group ID included in the payment history. The registration unit 111 registers the acquired payment history in association with the acquired group ID in the storage unit 120 (Step S609).

Next, the specifying unit 116 specifies an action of the group by referring to the point ID 125b registered as the history information 125 in the storage unit 120 and the payment history (Step S610). In a case where the face authentication has succeeded for all the users belonging to the group (Yes in Step S507), the estimation unit 117 estimates a group attribute based on a personal attribute of each user belonging to the group (Step S611).

Next, the selection unit 118 selects the recommendation information 127 based on the group attribute estimated in Step S611 and the action specified in Step S610 (Step S612). Next, the output unit 119 outputs the recommendation information 127 selected in Step S612 to a predetermined display terminal (Step S613).

In a case where there is a user whose face authentication has failed among the users belonging to the group (No in Step S607), the determination unit 115 determines whether or not the face authentication has failed only for some of the users belonging to the group (Step S614). In a case where the face authentication of the user has failed, the authentication device 200 estimates the age group and gender of the user based on the face feature information, and transmits, as a response, the estimation result to the recommendation device 100a. In a case where the face authentication has failed for only some of the users belonging to the group (Yes in Step S614), the determination unit 115 specifies the group ID 123a including the user IDs 123b and 123c of the users whose face authentication has succeeded (Step S615). Next, the determination unit 115 collates the personal attribute associated with the group ID 123a specified in Step S615 with the age group and gender of the user received from the authentication device 200 (Step S616).

In a case where the personal attribute matches (Yes in Step S616), the recommendation device 100a outputs the recommendation information 127 according to the procedures illustrated in Steps S608 to S613. In a case where the personal attribute does not match (No in Step S616), the output unit 119 outputs the fact that the face authentication has failed (Step S617). The output destination in Step S617 may be the user terminal 400 operated by the user whose face authentication has succeeded, or may be a display terminal that does not depend on the user, such as the face authentication terminal 300 or a signage.

In a case where the face authentication has failed for all the users belonging to the group (No in Step S615), the output unit 119 outputs the fact that the face authentication has failed (Step S617). The output destination in this case is, for example, a display terminal that does not depend on the user, such as the face authentication terminal 300 and a signage.

Note that although FIG. 15 illustrates a case where the payment processing is performed in a case where the face authentication has succeeded, processing such as recording of an entrance/leaving history and recording of a participation history may be performed in a case where the face authentication has succeeded. The face authentication terminal 300 can include, in the group authentication request, a request for registration of the action history such as the entrance/leaving history and the participation history, similarly to the payment request. In addition, the face authentication terminal 300 may perform payment without depending on the face authentication. In this case, the group authentication request including the payment history is transmitted to the recommendation device 800a. The registration unit 111 registers the payment history included in the group authentication request in the storage unit 120. Examples of a method of making payment without depending on the face authentication include a method of making payment by using a credit card and a method of making payment by using electronic money.

In the above example, the face authentication terminal 300 transmits the group authentication request including the payment request. However, the face authentication terminal 300 may transmit the payment request before transmitting the group authentication request. In this case, for example, the face authentication terminal 300 captures an image including a face of a payment target person at the time of payment, and transmits the payment request including the captured image to the recommendation device 800a. The recommendation device 800a extracts face feature information of the payment target person and causes the authentication device 200 to perform the face authentication. The face authentication terminal 300 receives the face authentication result from the recommendation device 800a, and performs the payment processing in a case where the face authentication has succeeded. The face authentication terminal 300 transmits the group authentication request after transmitting the payment history to the recommendation device 800a.

Figure 16:
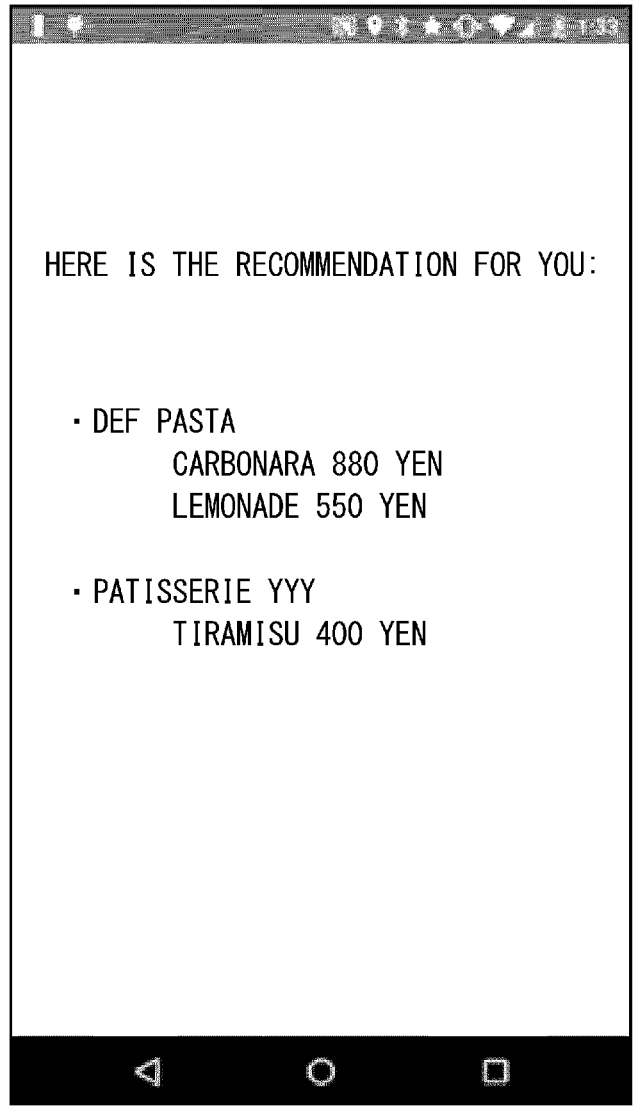
FIG. 16 is a diagram illustrating a recommendation information screen displayed on a display terminal.

FIG. 16 is a view illustrating the recommendation information 127 displayed on the display terminal. FIG. 16 illustrates a case where the recommendation information 127 is displayed on the user terminal 400. As illustrated in FIG. 16, the user terminal 400 displays the recommendation information 127 received in Step S613 on a screen. Note that, in Step S613, the output unit 119 may transmit the action history of the group to the display terminal in addition to the recommendation information 127.

Figure 17:
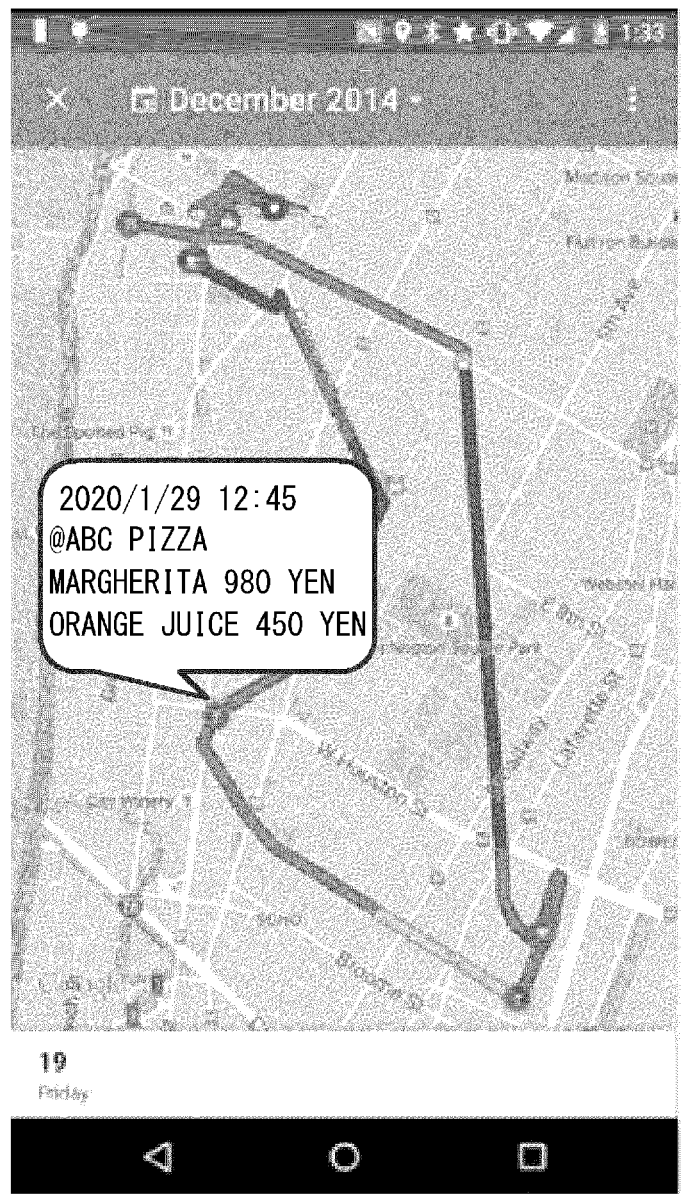
FIG. 17 is a diagram illustrating a map displayed on the display terminal.
Figure 18:
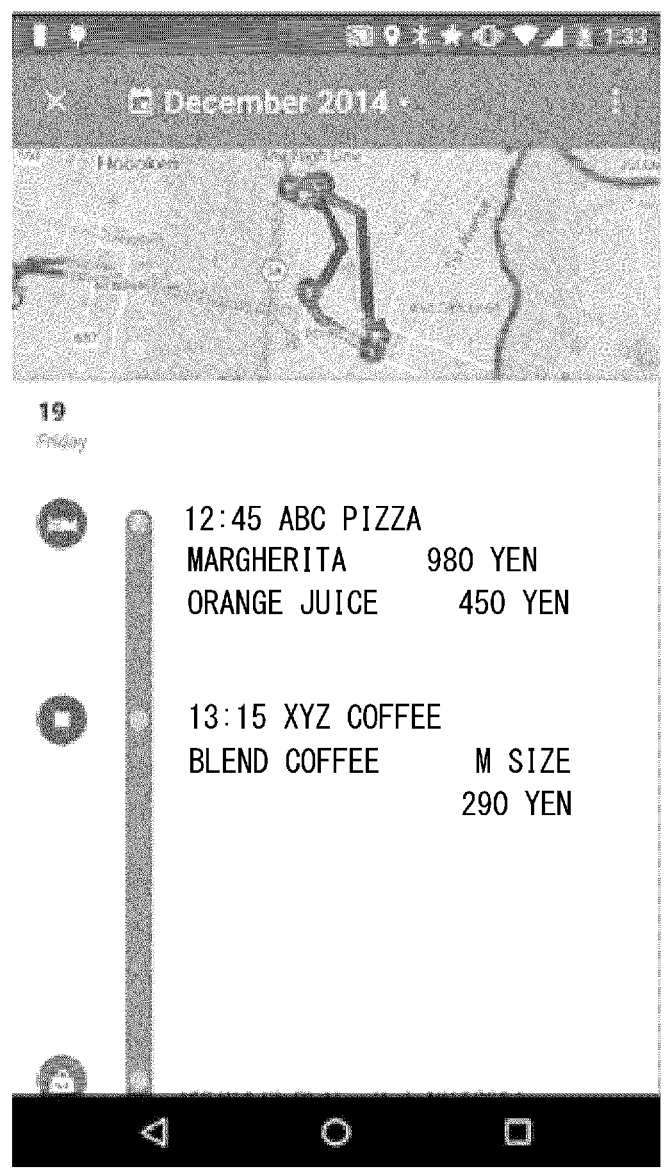
FIG. 18 is a diagram illustrating an action history displayed on the display terminal.

FIG. 17 is a view illustrating a map displayed as the action history on the display terminal. As illustrated in FIG. 17, the user terminal 400 may display the action history of the group received in Step S613 on the map. FIG. 18 is a view illustrating the action history displayed on the display terminal. As illustrated in FIG. 18, the user terminal 400 may display the action history received in Step S613 in time series. Note that FIGS. 17 and 18 illustrate the payment history as an example of the action history.

FIGS. 17 and 18 illustrate a case where only the action history of the group is displayed on the display terminal, but the recommendation information 127 may be displayed on the display terminal in addition to the action history. The recommendation information 127 may include store information, an address of the store, route guidance from the current location of the group to the store, and the like. The route guidance may include a distance from the current location of the group to the store, a required time, and the like. Further, a plurality of pieces of recommendation information 127 may be displayed on the display terminal. In a case where a plurality of pieces of recommendation information 127 are displayed, details of each piece of recommendation information 127, route guidance, and the like may be simultaneously displayed. Each user belonging to the group can examine the details of each piece of recommendation information 127, route guidance, and the like, and compare the pieces of recommendation information 127 with each other.

Hereinafter, specific examples of the recommendation condition 126 and the corresponding recommendation information 127 will be described. For example, in a case where the recommendation condition 126 is that "the group attribute indicates that only young people are included, and the action history is payment for food and drink", the recommendation information 127 is "guidance information to a karaoke". A group having finished eating and drinking is considered to go to an entertainment facility where the group can have fun later. In addition, a group including only young people is considered to prefer a karaoke as an entertaining facility. In a case where the recommendation condition 126 is that "the group attribute indicates that only young people are included, and the action history is payment for bowling", the recommendation information 127 is "guidance information to an all-you-can-eat restaurant". A group having played bowling is considered to have a meal after playing bowling. In addition, a group including only young people is considered to prefer an all-you-can-eat restaurant.

In a case where the recommendation condition 126 is that "the group attribute indicates that only females are included, and the action history is a travel book purchase history", the recommendation information 127 is "guidance information to a predetermined cafe". A group having purchased a travel book is considered to visit a store or the like where the group can have a conversation in order to make a travel plan later. In addition, it is considered that a group including only females prefers a cafe as a place where they can talk. In a case where the recommendation condition 126 is that "the group attribute indicates that only high school students are included, and the action history is a payment history for a photo sticker", the recommendation information 127 is "guidance information to a snack bar". A group having taken a photo sticker is considered to have a snack after taking the photo sticker. In addition, A group including only high school students is considered to prefer a snack that they can eat on the go.

The recommendation information 127 of each specific example described above may be "presentation of a discount coupon usable in a store" or the like. Presenting the recommendation information 127 corresponding to a group satisfying the above-described recommendation condition 126 is presenting the recommendation information 127 further matching the demand and preference of the group. Therefore, it is possible to further increase the utilization rate of the presented recommendation information 127.

Since the recommendation device according to the present example embodiment can present the recommendation information 127 by using the action history, it is possible to provide the recommendation information 127 more appropriate for a group. Furthermore, the recommendation device according to the present example embodiment can achieve effects similar to the effects described in the first to third example embodiments.

Fifth Example Embodiment

A fifth example embodiment is a modification of the first to fourth example embodiments described above. In the recommendation systems 700 and 900 according to the first to fourth example embodiments, the recommendation information 127 is specified based on a visit to one point or an action history at the point. On the other hand, in the fifth example embodiment, the recommendation information 127 is specified based on visits to a plurality of points or an action history at each point.

In the present example embodiment, as illustrated in FIGS. 5 and 13, imaging devices such as the face authentication terminal 300 are installed at a plurality of points, and the group visits two or more points among the plurality of points. When visiting each point, the face authentication terminal 300 installed at the point performs the group authentication by the face authentication for the group. Every time the group authentication succeeds, the registration unit 111 registers the point ID of the point where the authentication has succeeded in association with the group ID 125a of the group in the storage unit 120. In a case where two or more point IDs 125b are registered in the history information 125 of the group, the specifying unit 116 specifies all the actions at each point. The selection unit 118 selects the recommendation information 127 based on a set of the group attribute and the action.

Hereinafter, specific examples of the recommendation condition 126 and the corresponding recommendation information 127 will be described. For example, in a case where the recommendation condition 126 is that "the group attribute indicates that only young people are included, and the action history is payment for bowling and food and drink", the recommendation information 127 is "guidance information to an aquarium". A group having finished eating and drinking is considered to go to a facility where the group can have fun later. In addition, a group having already visited a bowling alley is considered to prefer a facility where the group can enjoy activities other than sports. In a case where the recommendation condition 126 is that "the group attribute indicates that only females are included, and the action history is a payment history for a predetermined number or more of products", the recommendation information 127 is "guidance information to a cafe where many baggage can be placed". A group including only females who have purchased a product is considered to visit a cafe to take a break after the purchase. In addition, a group having purchased a large amount of baggage is considered to prefer a store having a large space for putting baggage.

Since the recommendation system according to the present example embodiment can specify recommendation information based on a plurality of actions, it is possible to provide recommendation information more appropriate for a group. Furthermore, the recommendation device according to the present example embodiment can achieve effects similar to the effects described in the first to fifth example embodiments.

Note that, although the hardware configuration has been described in the above-described example embodiments, the present disclosure is not limited thereto. According to the present disclosure, arbitrary processing can also be implemented by causing a CPU to execute a computer program.

In the above example, the program may be stored using various types of non-transitory computer-readable media and supplied to a computer. The non-transitory computer-readable media include various types of tangible storage media. Examples of the non-transitory computer-readable medium include a magnetic recording medium (for example, a flexible disk, a magnetic tape, or a hard disk drive), an optical magnetic recording medium (for example, a magneto-optical disk), a compact disc-read only memory (CD-ROM), a CD-R, a CD-R/W, a digital versatile disc (DVD), and a semiconductor memory such as a mask ROM, a programmable ROM (PROM), an erasable PROM (EPROM), a flash ROM, or a random access memory (RAM). In addition, the program may be supplied to the computer by various types of transitory computer-readable media. Examples of the transitory computer-readable medium include an electric signal, an optical signal, and electromagnetic waves. The transitory computer-readable medium can provide the program to the computer via a wired communication line such as electric wires and optical fibers or a wireless communication line.

Note that the present disclosure is not limited to the above example embodiments, and can be appropriately changed without departing from the gist. Furthermore, the present disclosure may be implemented by appropriately combining the respective example embodiments.

The whole or part of the example embodiments disclosed above can be described as, but not limited to, the following Supplementary Notes.

(Supplementary Note A1)

A recommendation device including:
an acquisition unit configured to acquire a captured image obtained by imaging a plurality of persons by an imaging device installed at a predetermined point;
a personal authentication control unit configured to cause face authentication to be performed for a plurality of face regions detected from the captured image by using an authentication device that stores face feature information of a plurality of users;
a determination unit configured to determine that group authentication has succeeded in a case where face authentication using at least one of the plurality of users registered as a group and any one of the plurality of detected face regions has succeeded;
a specifying unit configured to specify an action in the group based on the point in a case where the group authentication has succeeded;
an estimation unit configured to estimate a group attribute based on a personal attribute of each user belonging to the group;
a selection unit configured to select recommendation information based on the group attribute and the action; and
an output unit configured to output the selected recommendation information to a predetermined display terminal.

(Supplementary Note A2)

The recommendation device according to Note A1, in which the specifying unit specifies the action based on an action history of at least one person in the group at the point in a case where the group authentication has succeeded.

(Supplementary Note A3)

The recommendation device according to Supplementary Note A2, in which
the captured image is an image captured when payment is made by at least one person in the group at the point,
the action history is a payment history at the point, and
the specifying unit specifies the action based on the payment history in a case where the group authentication has succeeded.

(Supplementary Note A4)

The recommendation device according to Supplementary Note A3, in which the payment history is a history of payment made in a case where the face authentication has succeeded.

(Supplementary Note A5)

The recommendation device according to any one of Supplementary Notes A1 to A4, in which
the imaging device is installed at each of a plurality of different points,
the recommendation device further includes a registration unit configured to register the point in association with the group in a case where the group authentication has succeeded,
the specifying unit specifies, in a case where two or more points are associated with the group, a set of the actions at the respective points, and
the selection unit selects the recommendation information based on a set of the group attribute and the action.

(Supplementary Note A6)

The recommendation device according to any one of Supplementary Notes A1 to A5, in which the determination unit estimates, in a case where the face authentication has succeeded for some users belonging to the group and the face authentication has failed for other users, a personal attribute based on a face region for which the face authentication has failed, and determines whether or not the group authentication is successful according to a degree of matching between the estimated personal attribute and the personal attribute of each user belonging to the group.

(Supplementary Note A7)

The recommendation device according to any one of Supplementary Notes A1 to A6, further including a storage unit configured to store a set of identification information of the plurality of users and the personal attribute as the group.

(Supplementary Note B1)

A recommendation system including:
an imaging device configured to capture an image including a face region of a predetermined user;
a recommendation device configured to be communicable with the imaging device; and
an authentication device configured to store face feature information of the user and be communicable with the recommendation device,
in which the recommendation device includes:
an acquisition unit configured to acquire a captured image obtained by imaging a plurality of persons by an imaging device installed at a predetermined point;
a personal authentication control unit configured to cause the authentication device to perform face authentication for a plurality of face regions detected from the captured image;
a determination unit configured to determine that group authentication has succeeded in a case where face authentication using at least one of the plurality of users registered as a group and any one of the plurality of detected face regions has succeeded;
a specifying unit configured to specify an action in the group based on the point in a case where the group authentication has succeeded;
an estimation unit configured to estimate a group attribute based on a personal attribute of each user belonging to the group;
a selection unit configured to select recommendation information based on the group attribute and the action; and
an output unit configured to output the selected recommendation information to a predetermined display terminal.

(Supplementary Note B2)

The recommendation system according to Note B1, in which the specifying unit specifies the action based on an action history of at least one person in the group at the point in a case where the group authentication has succeeded.

(Supplementary Note C1)

A recommendation method performed by a computer, the recommendation method including:
acquiring a captured image obtained by imaging a plurality of persons by an imaging device installed at a predetermined point;
causing face authentication to be performed for a plurality of face regions detected from the captured image by using an authentication device that stores face feature information of a plurality of users;
determining that group authentication has succeeded in a case where face authentication using at least one of the plurality of users registered as a group and any one of the plurality of detected face regions has succeeded;
specifying an action in the group based on the point in a case where the group authentication has succeeded;
estimating a group attribute based on a personal attribute of each user belonging to the group;
selecting recommendation information based on the group attribute and the action; and
outputting the selected recommendation information to a predetermined display terminal.

(Supplementary Note D1)

A non-transitory computer-readable medium storing a recommendation program that causes a computer to perform:
acquiring a captured image obtained by imaging a plurality of persons by an imaging device installed at a predetermined point;
causing face authentication to be performed for a plurality of face regions detected from the captured image by using an authentication device that stores face feature information of a plurality of users;
determining that group authentication has succeeded in a case where face authentication using at least one of the plurality of users registered as a group and any one of the plurality of detected face regions has succeeded;
specifying an action in the group based on the point in a case where the group authentication has succeeded;
estimating a group attribute based on a personal attribute of each user belonging to the group;
selecting recommendation information based on the group attribute and the action; and
outputting the selected recommendation information to a predetermined display terminal.

(Supplementary Note E1)

A recommendation device including:
  an acquisition unit configured to acquire a captured image obtained by imaging a plurality of persons by an imaging device installed at a predetermined point;
  an authentication unit configured to perform face authentication for a plurality of face regions detected from the captured image by using face feature information of a plurality of users stored in advance;
  a determination unit configured to determine that group authentication has succeeded in a case where face authentication using at least one of the plurality of users registered as a group and any one of the plurality of detected face regions has succeeded;
  a specifying unit configured to specify an action in the group based on the point in a case where the group authentication has succeeded;
  an estimation unit configured to estimate a group attribute based on a personal attribute of each user belonging to the group;
  a selection unit configured to select recommendation information based on the group attribute and the action; and
  an output unit configured to output the selected recommendation information to a predetermined display terminal.

(Supplementary Note E2)

The recommendation device according to Note E1, in which the specifying unit specifies the action based on an action history of at least one person in the group at the point in a case where the group authentication has succeeded.

(Supplementary Note F1)

A recommendation method performed by a computer, the recommendation method including:
  acquiring a captured image obtained by imaging a plurality of persons by an imaging device installed at a predetermined point;
  performing face authentication for a plurality of face regions detected from the captured image by using face feature information of a plurality of users stored in advance;
  determining that group authentication has succeeded in a case where face authentication using at least one of the plurality of users registered as a group and any one of the plurality of detected face regions has succeeded;
  specifying an action in the group based on the point in a case where the group authentication has succeeded;
  estimating a group attribute based on a personal attribute of each user belonging to the group;
  selecting recommendation information based on the group attribute and the action; and
  outputting the selected recommendation information to a predetermined display terminal.

(Supplementary Note G1)

A non-transitory computer-readable medium storing a recommendation program that causes a computer to perform:
  acquiring a captured image obtained by imaging a plurality of persons by an imaging device installed at a predetermined point;
  performing face authentication for a plurality of face regions detected from the captured image by using face feature information of a plurality of users stored in advance;
  determining that group authentication has succeeded in a case where face authentication using at least one of the plurality of users registered as a group and any one of the plurality of detected face regions has succeeded;
  specifying an action in the group based on the point in a case where the group authentication has succeeded;
  estimating a group attribute based on a personal attribute of each user belonging to the group;
  selecting recommendation information based on the group attribute and the action; and
  outputting the selected recommendation information to a predetermined display terminal.

Although the present invention has been described with reference to the example embodiments (and examples), the present invention is not limited to the above example embodiments (and examples). Various modifications that can be understood by those skilled in the art can be made to the configuration and details of the present invention within the scope of the present invention.

REFERENCE SIGNS LIST 100, 100a, 600, 800a RECOMMENDATION DEVICE
700, 900 RECOMMENDATION SYSTEM
110 CONTROL UNIT
111 REGISTRATION UNIT
112 ACQUISITION UNIT
113 REGION DETECTION UNIT
114 PERSONAL AUTHENTICATION CONTROL UNIT
115 DETERMINATION UNIT
116 SPECIFYING UNIT
117 ESTIMATION UNIT
118 SELECTION UNIT
119 OUTPUT UNIT
120 STORAGE UNIT
123 GROUP INFORMATION
123a GROUP ID
123b, 123c USER ID
123d, 123e ATTRIBUTE INFORMATION
124 PROGRAM
125 HISTORY INFORMATION
125a GROUP ID
125b POINT ID
126 RECOMMENDATION CONDITION
127 RECOMMENDATION INFORMATION
121 AUTHENTICATION UNIT
130 MEMORY
140 COMMUNICATION UNIT
200 AUTHENTICATION DEVICE
210 FACE FEATURE DB
220 FACE DETECTION UNIT
230 FEATURE POINT EXTRACTION UNIT
240 REGISTRATION UNIT
250 AUTHENTICATION UNIT
300(300X, 300Y) FACE AUTHENTICATION TERMINAL
310 CAMERA
320 STORAGE UNIT
330 COMMUNICATION UNIT
340 DISPLAY UNIT
350 CONTROL UNIT
352 IMAGING UNIT
353 REGISTRATION UNIT
354 AUTHENTICATION UNIT
355 PAYMENT UNIT
400 USER TERMINAL
410 CAMERA
420 STORAGE UNIT

430 COMMUNICATION UNIT
440 DISPLAY UNIT
450 CONTROL UNIT
451 IMAGING UNIT
452 IMAGING UNIT
453 REGISTRATION UNIT
454 AUTHENTICATION UNIT
455 PAYMENT UNIT
500 NETWORK

What is claimed is:

1. A recommendation device comprising:
at least one memory acquiring storing instructions and
at least one processor configured to execute the instructions to;
acquire a captured image obtained by imaging a plurality of persons by an imaging device installed at a predetermined point and captured in a case where payment is made by at least one person in a group at the point;
cause face authentication to be performed for a plurality of face regions detected from the captured image by using an authentication device that stores face feature information of a plurality of users;
determine that group authentication has succeeded in a case where face authentication using at least one of the plurality of users registered as the group and any one of the plurality of detected face regions has succeeded;
specify an action in the group based on a payment history of at least one person in the group at the point in a case where the group authentication has succeeded;
estimate a group attribute based on a personal attribute of each user belonging to the group;
select recommendation information based on the group attribute and the action; and
output the selected recommendation information to a predetermined display terminal.

2. The recommendation device according to claim 1, wherein the payment history is a history of payment made in a case where the face authentication has succeeded.

3. The recommendation device according to claim 1, wherein
the imaging device is installed at each of a plurality of different points,
the at least one processor is further configured to execute the instructions to;
register the point in association with the group in a case where the group authentication has succeeded,
specify, in a case where two or more points are associated with the group, a set of the actions at the respective points, and
select the recommendation information based on a set of the group attribute and the action.

4. The recommendation device according to claim 1, wherein the at least one processor is further configured to execute the instructions to estimate, in a case where the face authentication has succeeded for some users belonging to the group and the face authentication has failed for other users, a personal attribute based on a face region for which the face authentication has failed, and determines whether or not the group authentication is successful according to a degree of matching between the estimated personal attribute and the personal attribute of each user belonging to the group.

5. The recommendation device according to claim 1, wherein the at least one memory is configured to store a set of identification information of the plurality of users and the personal attribute as the group.

6. A recommendation system comprising:
an imaging device configured to capture an image including a face region of a predetermined user;
a recommendation device configured to be communicable with the imaging device; and
an authentication device configured to store face feature information of the user and be communicable with the recommendation device,
wherein the recommendation device includes:
acquisition means for acquiring a captured image obtained by imaging a plurality of persons by an imaging device installed at a predetermined point and captured in a case where payment is made by at least one person in a group at the point;
personal authentication control means for causing the authentication device to perform face authentication for a plurality of face regions detected from the captured image;
determination means for determining that group authentication has succeeded in a case where face authentication using at least one of the plurality of users registered as the group and any one of the plurality of detected face regions has succeeded;
specifying means for specifying an action in the group based on a payment history of at least one person in the group at the point in a case where the group authentication has succeeded;
estimation means for estimating a group attribute based on a personal attribute of each user belonging to the group;
selection means for selecting recommendation information based on the group attribute and the action; and
output means for outputting the selected recommendation information to a predetermined display terminal.

7. A recommendation method performed by a computer, the recommendation method comprising:
acquiring a captured image obtained by imaging a plurality of persons by an imaging device installed at a predetermined point and captured in a case where payment is made by at least one person in a group at the point;
causing face authentication to be performed for a plurality of face regions detected from the captured image by using an authentication device that stores face feature information of a plurality of users;
determining that group authentication has succeeded in a case where face authentication using at least one of the plurality of users registered as the group and any one of the plurality of detected face regions has succeeded;
specifying an action in the group based on a payment history of at least one person in the group at the point in a case where the group authentication has succeeded;
estimating a group attribute based on a personal attribute of each user belonging to the group;
selecting recommendation information based on the group attribute and the action; and
outputting the selected recommendation information to a predetermined display terminal.

8. A non-transitory computer-readable medium storing a recommendation program that causes a computer to perform:
acquiring a captured image obtained by imaging a plurality of persons by an imaging device installed at a predetermined point and captured in a case where payment is made by at least one person in a group at the point;
causing face authentication to be performed for a plurality of face regions detected from the captured image by using an authentication device that stores face feature information of a plurality of users;

determining that group authentication has succeeded in a case where face authentication using at least one of the plurality of users registered as the group and any one of the plurality of detected face regions has succeeded;

specifying an action in the group based on a payment history of at least one person in the group at the point in a case where the group authentication has succeeded;

estimating a group attribute based on a personal attribute of each user belonging to the group;

selecting recommendation information based on the group attribute and the action; and outputting the selected recommendation information to a predetermined display terminal.

9. A recommendation device comprising:

at least one memory acquiring storing instructions and at least one processor configured to execute the instructions to;

acquire a captured image obtained by imaging a plurality of persons by an imaging device installed at a predetermined point and captured in a case where payment is made by at least one person in a group at the point;

perform face authentication for a plurality of face regions detected from the captured image by using face feature information of a plurality of users stored in advance;

determine that group authentication has succeeded in a case where face authentication using at least one of the plurality of users registered as the group and any one of the plurality of detected face regions has succeeded;

specify an action in the group based on a payment history of at least one person in the group at the point in a case where the group authentication has succeeded;

estimate a group attribute based on a personal attribute of each user belonging to the group;

select recommendation information based on the group attribute and the action; and output the selected recommendation information to a predetermined display terminal.

10. A recommendation method performed by a computer, the recommendation method comprising:

acquiring a captured image obtained by imaging a plurality of persons by an imaging device installed at a predetermined point and captured in a case where payment is made by at least one person in a group at the point;

performing face authentication for a plurality of face regions detected from the captured image by using face feature information of a plurality of users stored in advance;

determining that group authentication has succeeded in a case where face authentication using at least one of the plurality of users registered as the group and any one of the plurality of detected face regions has succeeded;

specifying an action in the group based on a payment history of at least one person in the group at the point in a case where the group authentication has succeeded;

estimating a group attribute based on a personal attribute of each user belonging to the group;

selecting recommendation information based on the group attribute and the action; and outputting the selected recommendation information to a predetermined display terminal.

11. A non-transitory computer-readable medium storing a recommendation program that causes a computer to perform:

acquiring a captured image obtained by imaging a plurality of persons by an imaging device installed at a predetermined point and captured in a case where payment is made by at least one person in a group at the point;

performing face authentication for a plurality of face regions detected from the captured image by using face feature information of a plurality of users stored in advance;

determining that group authentication has succeeded in a case where face authentication using at least one of the plurality of users registered as the group and any one of the plurality of detected face regions has succeeded;

specifying an action in the group based on a payment history of at least one person in the group at the point in a case where the group authentication has succeeded;

estimating a group attribute based on a personal attribute of each user belonging to the group;

selecting recommendation information based on the group attribute and the action; and outputting the selected recommendation information to a predetermined display terminal.

* * * * *